(12) United States Patent
Bang et al.

(10) Patent No.: US 12,135,487 B2
(45) Date of Patent: Nov. 5, 2024

(54) DISPLAY DEVICE

(71) Applicant: Samsung Display Co., Ltd., Yongin-si (KR)

(72) Inventors: Hyun-Chol Bang, Seongnam-si (KR); Won Kyu Kwak, Seongnam-si (KR); Dong Wook Kim, Asan-si (KR); Jin Woo Park, Asan-si (KR); Sun-Ja Kwon, Gunpo-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/301,483

(22) Filed: Apr. 17, 2023

(65) Prior Publication Data

US 2023/0296950 A1 Sep. 21, 2023

Related U.S. Application Data

(63) Continuation of application No. 17/372,956, filed on Jul. 12, 2021, now Pat. No. 11,656,518, which is a (Continued)

(30) Foreign Application Priority Data

Oct. 31, 2018 (KR) ........................ 10-2018-0132038

(51) Int. Cl.
*G02F 1/1362* (2006.01)
*G02F 1/1368* (2006.01)

(52) U.S. Cl.
CPC ...... *G02F 1/1368* (2013.01); *G02F 1/136227* (2013.01); *G02F 1/136286* (2013.01);
(Continued)

(58) Field of Classification Search
CPC .................................................... G02F 1/1362
See application file for complete search history.

(56) References Cited

U.S. PATENT DOCUMENTS 6,798,145 B2 9/2004 Ishizuka
7,091,936 B1 8/2006 Yamada
(Continued)

FOREIGN PATENT DOCUMENTS

CN 103440822 12/2013
CN 107194321 9/2017
(Continued)

OTHER PUBLICATIONS

Extended European Search Report corresponding to European Application or Patent No. 19204161.4 dated Apr. 14, 2020.
(Continued)

*Primary Examiner* — Sang V Nguyen
(74) *Attorney, Agent, or Firm* — KILE PARK REED & HOUTTEMAN PLLC

(57) ABSTRACT

A display device includes a first display area including a plurality of first pixel areas and a second display area including a plurality of second pixel areas and a plurality of light transmitting areas. Each of the plurality of first pixel areas includes at least one first pixel to display an image. Each of the plurality of second pixel areas includes at least one second pixel to display the image. The light transmitting area does not include a pixel capable of displaying the image and has higher light transmittance than the second pixel area. In the second display area, at least one of the plurality of light transmitting areas is between two second pixel areas adjacent in a first direction, and at least one of the plurality of light transmitting areas is between two second pixel areas adjacent in a second direction different from the first direction.

23 Claims, 33 Drawing Sheets

Related U.S. Application Data continuation of application No. 16/657,442, filed on Oct. 18, 2019, now Pat. No. 11,061,295.

(52) U.S. Cl.
CPC .. *G02F 2201/121* (2013.01); *G02F 2201/123* (2013.01); *G02F 2201/52* (2013.01)

(56) References Cited

U.S. PATENT DOCUMENTS

| | | | |
|---|---|---|---|
| 9,767,782 | B2 | 9/2017 | Takeda |
| 9,767,785 | B2 | 9/2017 | Ashby et al. |
| 9,864,400 | B2 | 1/2018 | Evans, V et al. |
| 10,186,191 | B2 | 1/2019 | Kang et al. |
| 10,482,811 | B2 | 11/2019 | Kang et al. |
| 10,552,696 | B2 | 2/2020 | Cho et al. |
| 10,573,235 | B2 | 2/2020 | Cui et al. |
| 10,733,931 | B2 | 8/2020 | Jung et al. |
| 11,138,927 | B2 | 10/2021 | Jung et al. |
| 11,521,410 | B2 | 12/2022 | Cho et al. |
| 2003/0052618 | A1* | 3/2003 | Ishizuka ............ H10K 59/1213 315/161 |
| 2006/0244696 | A1* | 11/2006 | Jung ................ H10K 59/1213 345/77 |
| 2009/0279029 | A1 | 11/2009 | Kunii et al. |
| 2010/0025692 | A1* | 2/2010 | Hsiao ................ H01L 29/42384 257/E33.053 |
| 2010/0128028 | A1* | 5/2010 | Lee ..................... G09G 3/3677 345/87 |
| 2014/0307430 | A1* | 10/2014 | Lo ............................ G09F 9/30 362/231 |
| 2015/0144934 | A1 | 5/2015 | Rappoport et al. |
| 2016/0141353 | A1* | 5/2016 | Kim ..................... H10K 59/353 257/773 |
| 2016/0315127 | A1* | 10/2016 | Yoon .................... H10K 59/352 |
| 2016/0320674 | A1* | 11/2016 | Seo .................. G02F 1/134309 |
| 2018/0081228 | A1* | 3/2018 | Ono .................. G02F 1/133528 |
| 2018/0090695 | A1 | 3/2018 | Maruyama |
| 2018/0129328 | A1* | 5/2018 | Park ..................... G06F 3/0412 |
| 2018/0165533 | A1* | 6/2018 | Cho ....................... G09G 5/003 |
| 2019/0123306 | A1 | 4/2019 | Liang et al. |
| 2019/0212622 | A1* | 7/2019 | Xi ......................... H01L 27/124 |
| 2020/0019747 | A1 | 1/2020 | Yang et al. |
| 2020/0051497 | A1* | 2/2020 | Kang .................. H10K 50/8426 |
| 2020/0135148 | A1 | 4/2020 | Bai et al. |
| 2020/0310184 | A1 | 10/2020 | Imai et al. |
| 2022/0020321 | A1 | 1/2022 | Jung et al. |

FOREIGN PATENT DOCUMENTS

| | | |
|---|---|---|
| CN | 107863448 | 3/2018 |
| CN | 108234693 | 6/2018 |
| CN | 108269502 | 7/2018 |
| CN | 108538206 | 9/2018 |
| JP | 2003-92183 | 3/2003 |
| JP | 5714398 | 5/2015 |
| KR | 10-2015-0029362 | 3/2015 |
| KR | 10-2017-0024182 | 3/2017 |
| KR | 10-2017-0065059 | 6/2017 |
| KR | 10-2017-0113066 | 10/2017 |
| KR | 10-2018-0050473 | 5/2018 |
| KR | 10-1859105 | 5/2018 |
| KR | 10-2018-0063627 | 6/2018 |
| KR | 10-2018-0065722 | 6/2018 |
| KR | 10-2018-0067196 | 6/2018 |
| KR | 10-2018-0072303 | 6/2018 |

OTHER PUBLICATIONS

Extended European Search Report corresponding to European Patent Application No. 19204146.5 dated Jan. 7, 2020.
Chinese Office Action for Chinese Patent Application No. 201911004857.X, dated Dec. 30, 2023.
Korean Office Action for Korean Patent Application No. 10-2018-0132038, dated Dec. 17, 2023.
Chinese Office Action for Chinese Patent Application No. 201911004857.X, dated Aug. 16, 2024.
Korean Notice of Allowance for Korean Patent Application No. 10-2018-0132038, dated Aug. 16, 2024.

\* cited by examiner

PUg

PUh

DISPLAY DEVICE

CROSS-REFERENCE TO RELATED APPLICATION(S)

This is a continuation application of U.S. patent application Ser. No. 17/372,956, filed Jul. 12, 2021, now U.S. Pat. No. 11,656,518, the disclosure of which is incorporated herein by reference in its entirety. U.S. patent application Ser. No. 17/372,956 is a continuation application of U.S. patent application Ser. No. 16/657,442, filed Oct. 18, 2019, now U.S. Pat. No. 11,061,295, issued Jul. 13, 2021, the disclosure of which is incorporated herein by reference in its entirety. U.S. patent application Ser. No. 16/657,442 claims priority to and benefit of Korean Patent Application No. 10-2018-0132038 under 35 U.S.C. § 119, filed on Oct. 31, 2018, in the Korean Intellectual Property Office, the entire contents of which are incorporated herein by reference.

BACKGROUND

1. Field

The present disclosure relates to a display device.

2. Description of the Related Art

A display device such as a liquid crystal display (LCD) and an organic light emitting diode (OLED) display includes a display panel including a plurality of pixels displaying an image. Each pixel includes a pixel electrode applied with a data signal, and the pixel electrode is connected to at least one transistor to be applied with the data signal. Recently, various display devices having functions in addition to image display have been developed.

SUMMARY

A display device according to an exemplary embodiment of the present disclosure includes a first display area including a plurality of first pixel areas and a second display area including a plurality of second pixel areas and a plurality of light transmitting areas. Each of the plurality of first pixel areas includes at least one first pixel capable of displaying an image. Each of the plurality of second pixel areas includes at least one second pixel capable of displaying the image. The light transmitting area does not include a pixel capable of displaying the image and has higher light transmittance than the second pixel area, in the second display area. At least one of the plurality of light transmitting areas is between two second pixel areas adjacent in a first direction and At least one of the plurality of light transmitting areas is between two second pixel areas adjacent in a second direction different from the first direction.

The at least one second pixel may include an active pattern, a driving gate electrode, a driving voltage line, a pixel electrode, an emission layer, and a common electrode that are electrically connected to each other for displaying the image, and the light transmitting area may not include at least part of at least one of the active pattern, the driving gate electrode, the driving voltage line, the pixel electrode, the emission layer, and the common electrode so that the image cannot be displayed in the light transmitting area.

In the second display area, each of the plurality of second pixel areas and each of the plurality of light transmitting areas may be alternately arranged in the first direction and the second direction.

Each of the plurality of second pixel areas may include a first color pixel outputting a first color, a second color pixel outputting a second color different from the first color, and a third color pixel outputting a third color different from the first color and the second color.

The first color pixel, the second color pixel, and the third color pixel may have a same shape as each other and be arranged in a line in the second pixel area.

Each of the second pixel areas may include one of the first color pixel, one of the second color pixel, and one of the third color pixel.

At least two of the first color pixel, the second color pixel, and the third color pixel may have sizes that are different from each other.

Each of the plurality of second pixel areas may include only one pixel outputting one color.

A structure of each of the plurality of first pixel areas may be different from a structure of each of the plurality of second pixel areas, or a shape of each of the plurality of first pixel areas may be different from a shape of the second pixel area.

Each of the plurality of first pixel area and each of the plurality of second pixel areas may include a first color pixel outputting a first color, a second color pixel outputting a second color different from the first color, and a third color pixel outputting a third color different from the first color and the second color. Each of the plurality of first pixel areas may have at least two of the first color pixel, the second color pixel, and the third color pixel with different sizes from each other.

The first color pixel, the second color pixel, and the third color pixel may have a same shape as each other and are arranged in a line in the second pixel area.

The size of the second color pixel in each of the plurality of first pixel areas and the size of the second color pixel in each of the plurality of second pixel areas may be different from each other.

In each of the plurality of the second pixel areas, the first color pixel, the second color pixel, and the third color pixel may include a transistor, respectively, and in each of the plurality of second pixel areas, a channel length of a channel region of the transistor included in the second color pixel may be shorter than a channel length of a channel region of the transistor included in the first color pixel or the third color pixel.

In each of the plurality of second pixel areas, each of the first color pixel, the second color pixel, and the third color pixel may include a transistor, and in second pixel area, the channel width of the channel region of the transistor included in the second color pixel may be larger than the channel width of the channel region of the transistor included in the first color pixel or the third color pixel.

The first pixel and the second pixel may include a transistor, respectively, and the channel length of the channel region of the transistor included in the second color pixel may be shorter than the channel length of the channel region of the transistor included in the first color pixel.

The first pixel and the second pixel may include a transistor, respectively, and the channel width of the channel region of the transistor included in the second color pixel may be larger than the channel width of the channel region of the transistor included in the first color pixel.

A display device according to an exemplary embodiment includes: a first display area including a plurality of first pixel areas; and a second display area including a plurality of second pixel areas and a plurality of light transmitting areas. Each of the plurality of first pixel areas includes at least one first pixel to display an image. Each of the plurality of second pixel areas includes at least one second pixel to display the image, the light transmitting area does not include a pixel capable of displaying the image and has higher light transmittance than the second pixel area. A structure of each of the plurality of first pixel areas is different from a structure of each of the plurality of second pixel areas, or a shape of each of the plurality of first pixel areas is different from a shape of each of the plurality of second pixel areas.

A display device according to an exemplary embodiment includes: a first display area including a plurality of first pixel areas; and a second display area including a plurality of second pixel areas and a plurality of light transmitting areas. Each of the plurality of first pixel areas includes at least one first pixel to display an image. Each of the plurality of second pixel areas includes at least one second pixel to display the image. The light transmitting area does not include a pixel capable of displaying the image and has higher light transmittance than the second pixel area, the plurality of first pixels included in the first pixel area are arranged in a row direction. The plurality of second pixel areas form a plurality of first columns. The plurality of light transmitting areas form a plurality of second columns. The plurality of first columns and the plurality of second columns are alternately arranged in the first direction.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
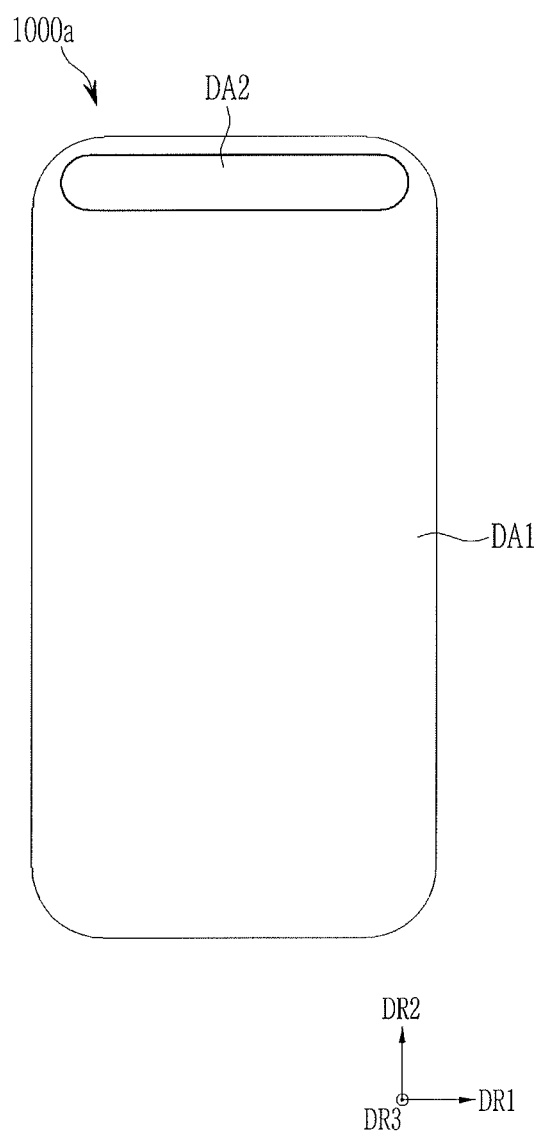
FIG. 1, FIG. 2, and FIG. 3 illustrate schematic layout views showing a display area of a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In describing embodiments, parts that are not related to the description will be omitted. Like reference numerals generally designate like elements throughout the specification.

In addition, the size and thickness of each configuration shown in the drawings are arbitrarily shown for better understanding and ease of description, but embodiments are not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Throughout this specification, a plan view means a view when observing a surface parallel to two directions (e.g., a first direction DR1 and a second direction DR2) crossing each other, and a cross-sectional view means a view when observing a surface cut in a direction (e.g., a third direction) perpendicular to the surface parallel to the first direction DR1 and the second direction DR2. Also, overlapping two constituent elements means that two constituent elements overlap in the third direction (e.g., a direction perpendicular to an upper surface of the substrate) unless stated otherwise.

Figure 2:
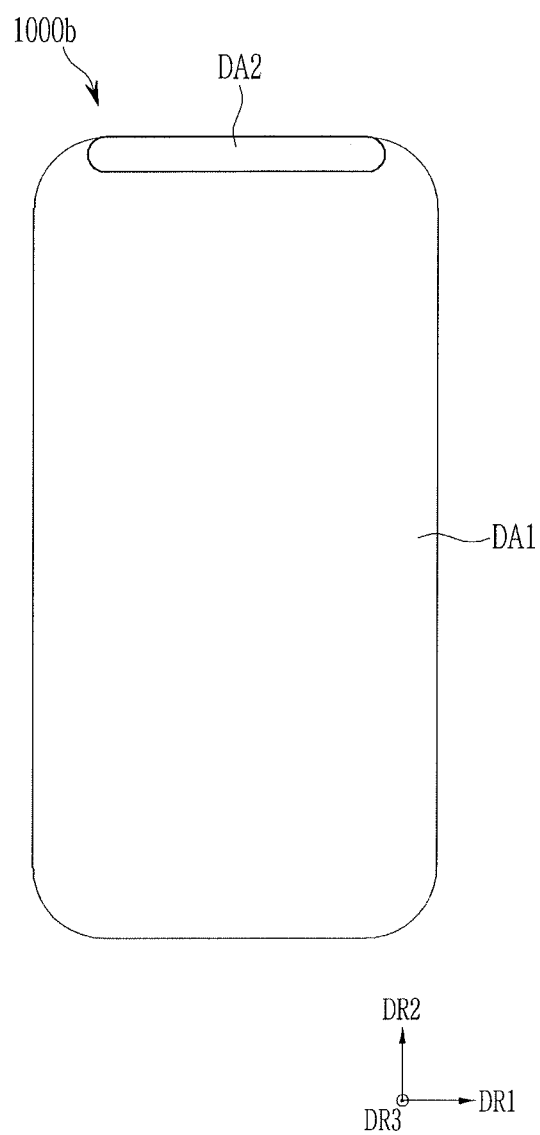
Figure 3:
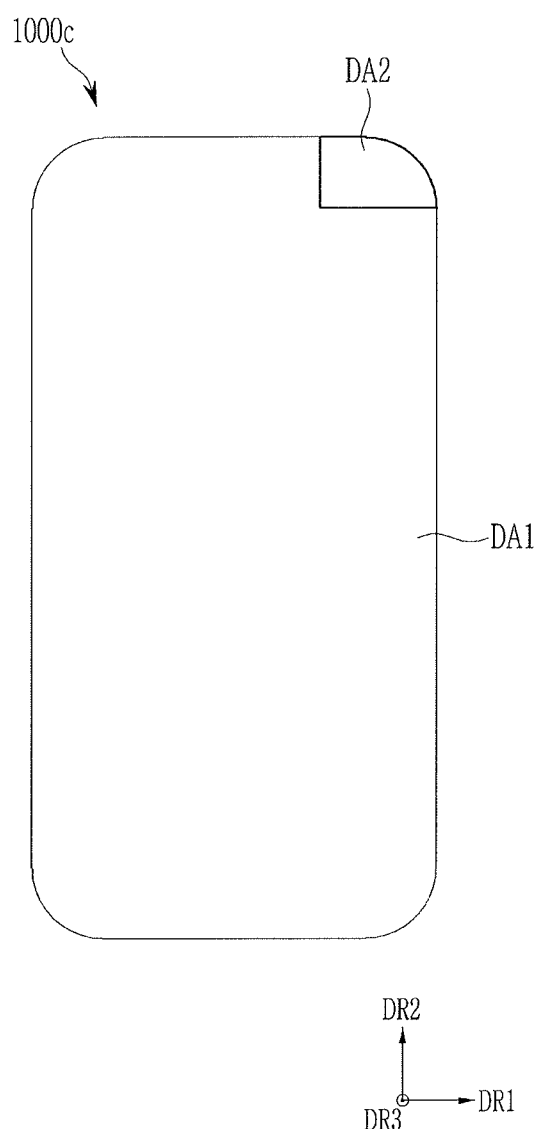
Figure 4:
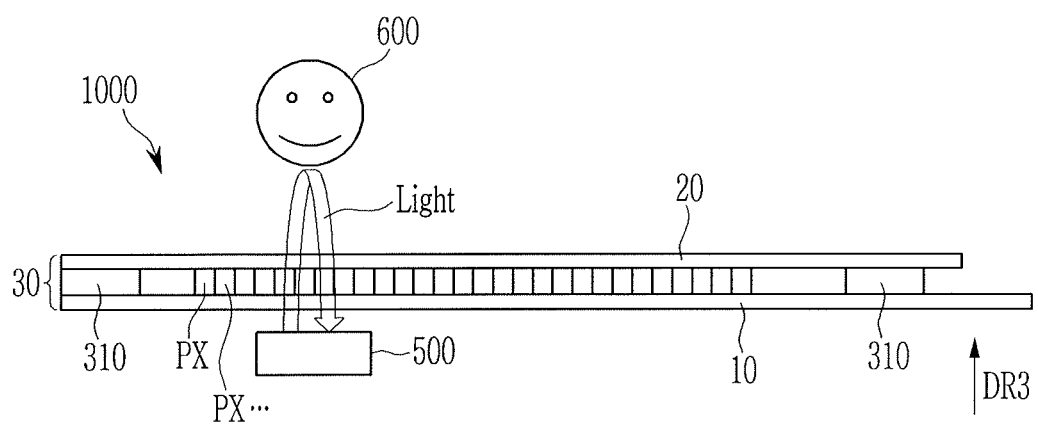
FIG. 4 illustrates a schematic cross-sectional view of a display device according to an exemplary embodiment.

Now, a structure of a display device according to an exemplary embodiment is described with reference to FIG. 1 to FIG. 4. FIG. 1, FIG. 2, and FIG. 3 are schematic layout views showing a display area of a display device according to an exemplary embodiment. FIG. 4 is a schematic cross-sectional view of a display device according to an exemplary embodiment.

Referring to FIG. 1 to FIG. 4, a display area included in display devices 1000, 1000a, 1000b, and 1000c according to an exemplary embodiment may include a first display area DA1 as a region that may display an image and a second display area DA2 capable of having functions other than, e.g., in addition to, displaying an image.

The second display area DA2 may receive or emit more light of a different wavelength from light of the displayed image than the first display area DA1. For example, referring to FIG. 4, the display device 1000 according to an exemplary embodiment may include a display panel 30 and an optical member 500 behind the display panel 30. A wavelength used by the optical member 500 may pass through the second display area DA2 with higher light transmittance compared to the first display area DA1.

In the second display area DA2, a ratio of an area where the image may be displayed, i.e., a region occupied by the pixel area, may be smaller than a ratio of an area occupied by the pixel area in the first display area DA1. In particular, the second display area DA2 includes the pixel area and the light transmitting area having a higher light transmittance than the pixel area. There is no pixel that may display the image in the light transmitting area. Here, the pixel means a unit region where light of an image for an input image signal is output.

Referring to FIG. 1, the second display area DA2 may be enclosed, e.g., fully surrounded, by the first display area DA1 and may be near one side of the display device 1000a in a plan view. That is, in a plan view, the second display area DA2 may be between the second display area DA2 and the edge of the display device 1000a. For example, the second display area DA2 may be near the top of the display device 1000a and may have a planar shape extending in the first direction DR1 along most of the top edge of the display device 1000a.

Referring to FIG. 2, the second display area DA2 according to the present exemplary embodiment is the same as most of the exemplary embodiment shown in FIG. 1, but the first display area DA1 may not be around at least one side of the second display area DA2. That is, in a plan view, one edge of the second display area DA2 may match one edge of the display device 1000b, e.g., the first display area D1 may contact three sides of the second display area DA2. For example, when the second display area DA2 is near the top edge of the display device 1000b, the first display area DA1 may not be above the second display area DA2.

Referring to FIG. 3, the second display area DA2 according to the present exemplary embodiment is the same as the exemplary embodiment shown in FIG. 2, however the second display area DA2 may be adjacent to a corner edge of the display device 1000c or may be near the corner edge. In a plan view, one edge of the second display area DA2 may match one corner edge of the display device 1000c, e.g., the first display area D1 may contact only two sides of the second display area DA2. For example, when the second display area DA2 is near the top corner of the display device 1000c, one edge of the second display area DA2 may match the edge of one corner above the first display area DA1.

In addition, the second display area DA2 may be in various positions in the display area of the display device and may have various planar shapes. For example, the second display area DA2 may have a circular planar shape near the top edge of the display device.

Referring to FIG. 4, the display panel 30 included in the display device 1000 may include a substrate 10 in the first display area DA1 and the second display area DA2 described above. That is, the substrate 10 may be continuous.

A plurality of pixels PX may be between the substrate 10 and an encapsulation substrate 20. A sealant 310 between the substrate 10 and the encapsulation substrate 20 may be further at the edge of the display panel 30. The optical member 500 may be below the display panel 30. The optical member 500 may be a camera, a flash, a sensor, and the like.

The optical member 500 may emit light of a predetermined wavelength range toward an object 600 or may receive light reflected from the object 600. The light of the predetermined wavelength may be light of a wavelength other than a visible light used by the pixels PX to display the image. The light of the predetermined wavelength may pass mainly through the light transmitting area in the second display area DA2. When the optical member 500 is an infrared camera, the light of the predetermined wavelength may be infrared light, e.g., 900 nm to 1000 nm.

The optical member 500 may correspond to the entire second display area DA2 in a plan view or may only correspond to a part of the second display area DA2. For example, the optical member 500 may correspond to the part among the second display area DA2 shown in FIG. 1.

The first display area DA1 and the second display area DA2 of the display device according to an exemplary embodiment are now described with reference to FIG. 5 to FIG. 20 along with the above-described drawings. FIG. 5 to FIG. 12 are layout views of the first display area DA1 and the second display area DA2 of the display device according to an exemplary embodiment, and FIG. 13 to FIG. 20 show one pixel area of a display device according to an exemplary embodiment.

The first display area DA1 may include a plurality of pixel areas PU1, and the second display area DA2 may include a plurality of pixel areas PU2 and light transmitting areas TA.

In the first display area DA1, a plurality of pixel areas PU1 may be arranged in a matrix form, e.g., in a first direction DR1 and a second direction DR2, which are different directions, or in two diagonal directions intersecting each other in rows and columns. In the second display area DA2, the plurality of pixel areas PU2 and light transmitting areas TA may also be arranged, e.g., in a matrix, or may be variously arranged. Here, the diagonal direction means a direction intersecting both the first direction DR1 and the second direction DR2.

Each of the pixel areas PU1 and PU2 may contain a plurality of pixels or one pixel. The structure and/or shape of the pixel area PU1 and the structure and/or shape of the pixel area PU2 may be the same or different. In the first display area DA1, the structures of two neighboring pixel areas PU1 may be the same or different. In the second display area DA2, the structures of two neighboring pixel areas PU2 may be the same or different. For example, the structure of two pixel areas PU1 neighboring in the row or column direction in the first display area DA1 may be symmetrical to each other and the structure of two pixel areas PU2 neighboring in the row or column direction in the second display area DA2 may be symmetrical to each other.

FIG. 13 to FIG. 20 show examples of the pixel areas PU1 and PU2, respectively.

Referring to FIG. 13 to FIG. 18, each pixel area PU1 and/or pixel area PU2 may include a plurality of pixels that may output different colors. The color output by the plurality of pixels included in the pixel areas PU1 and PU2 may be three primary colors of red, green, and blue, or four primary colors, or the colors of the cyan, magenta, yellow, and/or white. For example, each pixel area PU1 and/or pixel area PU2 may include a red pixel (R), a green pixel (G), and a blue pixel (B). A combination that can output white light, e.g., containing at least one of the red pixel (R), the green pixel (G), and the blue pixel (B) as a combination outputting full colors of the image, is called a dot.

FIG. 13 to FIG. 15 and FIG. 17 shows an example where each pixel area PU1 and/or pixel area PU2 includes one red pixel (R), one green pixel (G), and one blue pixel (B).

Figure 13:
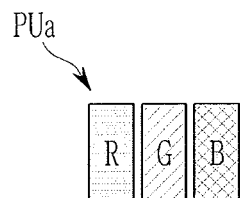
FIG. 13 to FIG. 20 illustrate views showing one pixel area of a display device according to an exemplary embodiment, respectively.

In the exemplary embodiment shown in FIG. 13, each pixel R, G, and B included in one pixel area PUa may be of the same shape, e.g., an approximate rectangle, and may be arranged in a line in one direction.

Figure 14:
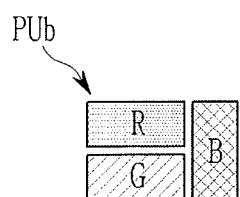

In the exemplary embodiment shown in FIG. 14, each pixel R, G, and B included in one pixel area PUb may be an approximate rectangle. Two pixels of the three pixels R, G, and B, for example the red pixel (R) and the green pixel (G) are arranged vertically adjacent to each other, and the remaining green pixel (G) may be along the vertical direction at one side of the red pixel (R) and the green pixel (G). Each red pixel (R) and green pixel (G) may be along the horizontal direction.

Figure 15:
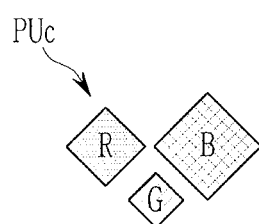

Each pixel R, G, and B included in one pixel area PUc in the exemplary embodiment shown in FIG. 15 may form an approximate rhombus shape. The sizes of the red pixel (R), the green pixel (G), and the blue pixel (B) may be different from each other. For example, the blue pixel (B) is the largest and the green pixel (G) is the smallest.

Figure 16:
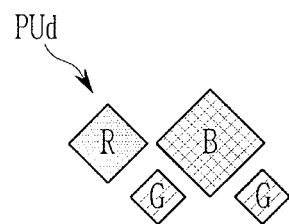

FIG. 16 shows an example in which each pixel area PU1 and/or pixel area PU2 includes one red pixel (R), one blue pixel (B), and two green pixels (G). Each pixel R, G, and B contained in a single pixel area PUd may be roughly rhombus-shaped. The sizes of the red pixel (R), the green pixel (G), and the blue pixel (B) may be different. For example, the blue pixel (B) is the largest and the green pixel (G) is the smallest.

Figure 17:
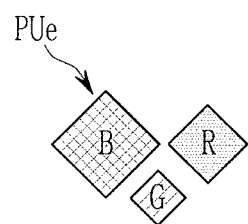
Figure 18:
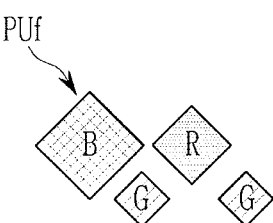

FIG. 17 and FIG. 18 are the same as most of the exemplary embodiment shown in FIG. 15 and FIG. 16, respectively, however the position of the red pixel (R) and the blue pixel (B) included in one pixel area PUe and PUf may be opposite to the position of the red pixel (R) and the blue pixel (B) in the pixel area PUc and PUd shown in FIG. 15 and FIG. 16.

Figure 19:
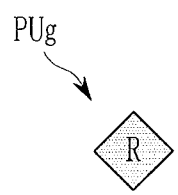
Figure 20:
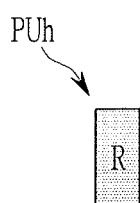

Referring to FIG. 19 and FIG. 20, each pixel area PU1 and/or pixel area PU2 may only include one pixel outputting a single color. For example, FIG. 19 and FIG. 20 show an example in which one pixel area PUg and PUh includes only one pixel, e.g., only the red pixel (R), and each pixel area PUg and PUh may include only the green pixel (G) or only the blue pixel (B). In this case, the second display area DA2 may display the single color among red, green, or blue. Referring to FIG. 19, the pixel (R) included in one pixel area PUg may be roughly rhombus-shaped. Referring to FIG. 20, the pixel (R) included in one pixel area PUh may be approximately rectangular.

In the exemplary embodiments shown in FIG. 13 to FIG. 20, the red pixel (R), the green pixel (G), and the blue pixel (B) the arrangement, number, and order or the pixels may vary. For example, in the exemplary embodiment shown in FIG. 16, the order of the red pixel (R), the green pixel (G), the blue pixel (B), and the green pixel (G) from the left is shown, however the order of the red pixel (R), the blue pixel (B), the green pixel (G), and the blue pixel (B) may be configured differently.

Again referring to FIG. 5, in the second display area DA2, the light transmitting area TA may be between two pixel areas PU2 adjacent in the first direction DR1, the second direction DR2, and the diagonal direction. That is, the pixel area PU2 and the light transmitting area TA may be alternately arranged in the first direction DR1, the second direction DR2, and the diagonal direction.

As described above, the light transmitting area TA has higher light transmittance than the pixel area PU2 and does not have a pixel, i.e., an image display unit capable of outputting light to display an image. The pixel areas PU1 and PU2 may each contain at least one pixel.

In detail, one pixel may include at least one transistor connected to the signal line and a light-emitting element electrically connected to the transistor. The light-emitting element may be a light emitting diode (LED) including a pixel electrode, a common electrode, and an emission layer between the pixel electrode and the common electrode. The pixel areas PU1 and PU2 include at least one transistor and light-emitting element, however the light transmitting area TA may not include at least one of the transistor, the pixel electrode, the common electrode, and the emission layer, so as not to display the image in accordance with an input image signal. Thus, the light transmitting area TA has a higher light transmittance than the pixel areas PU1 and PU2.

The planar size of the light transmitting area TA between two adjacent pixel areas PU2 may be similar, larger, or smaller than the planar size of one pixel area PU2. The planar size of the light transmitting area TA may be larger than the planar size of one pixel.

A common electrode 270 (see FIG. 37) may be in the first display area DA1 and the second display area DA2 of the display device according to an exemplary embodiment. The common electrode 270 of the first display area DA1 and the common electrode 270 of the second display area DA2 may be connected to each other as one electrode, and may transmit a constant common voltage. The common electrode 270 in the first display area DA1 may be formed continuously as one electrode without a cutout, an opening, a pattern, and the like. The common electrode in the second display area DA2 may include an opening corresponding to at least a portion of the light transmitting area TA so that the light transmitting area TA may not output light and may have the higher light transmittance due to the absence of the common electrode 270.

When the light is emitted from the optical member 500 behind the display panel or is incident to the optical member 500 through the display panel, since the light transmittance is high in the light transmitting area TA, a recognition rate and sensing accuracy of the object 600 to be recognized by the optical member 500 may be increased.

In the second display area DA2, the light transmitting area TA and the pixel area PU2 may be arranged in a regular arrangement, may display the image like the first display area DA1, and may have other functions by using the optical member 500.

The resolution of the second display area DA2 may be lower than the resolution of the first display area DA1. However, since the pixel area PU2 and the light transmitting area TA are alternately arranged in the second display area DA2, the displayed image may not be unduly deteriorated. Particularly, like FIG. 13, FIG. 14, FIG. 15, or FIG. 17, when the pixel area PU2 of the second display area DA2 includes one red pixel (R), one green pixel (G), and one blue pixel (B), the plane shape of a pixel area PU2 is almost square. Thus, if the pixel area PU2 is alternately and regularly arranged with the light transmitting area TA, the light transmittance may be increased without deteriorating the quality of the displayed image.

Figure 5:
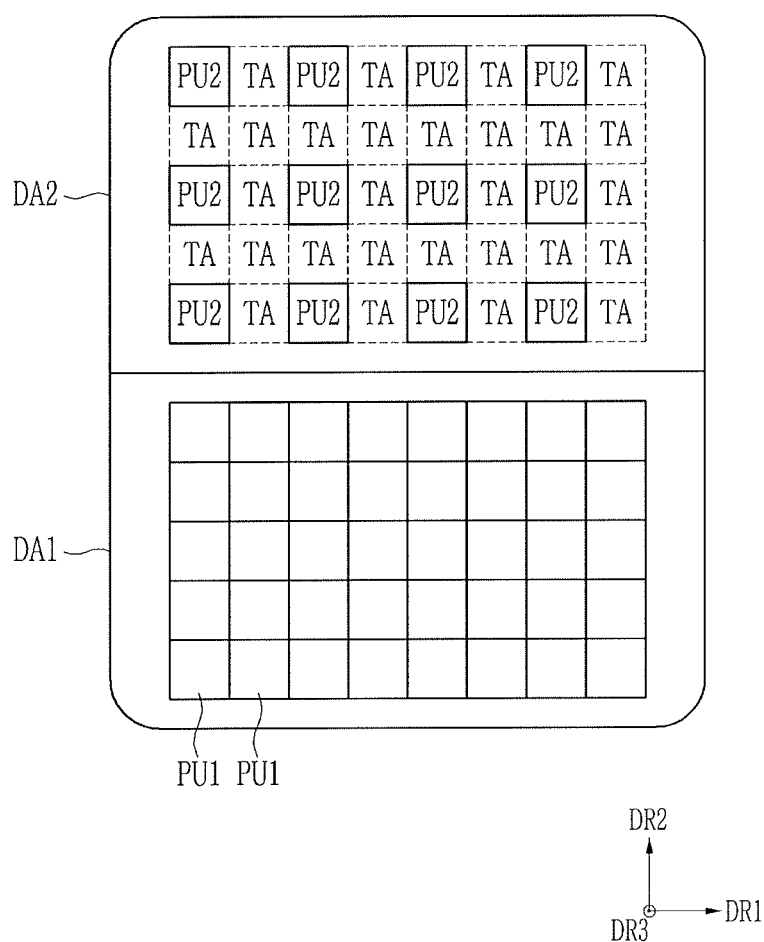
FIG. 5 to FIG. 12 illustrate layout views of a display area of a display device according to an exemplary embodiment, respectively.

Referring to FIG. 5, in the second display area DA2, the area of the light transmitting area TA between two pixel areas PU2 adjacent in the first direction DR1 and the second direction DR2 may be equal to, similar to, or different from the area of one pixel area PU2. The area of the light transmitting area TA may vary in the several exemplary embodiments without being constant, but one light transmitting area TA having the area corresponding to one pixel area PU2 is referred to as a unit light transmitting area TA.

Figure 6:
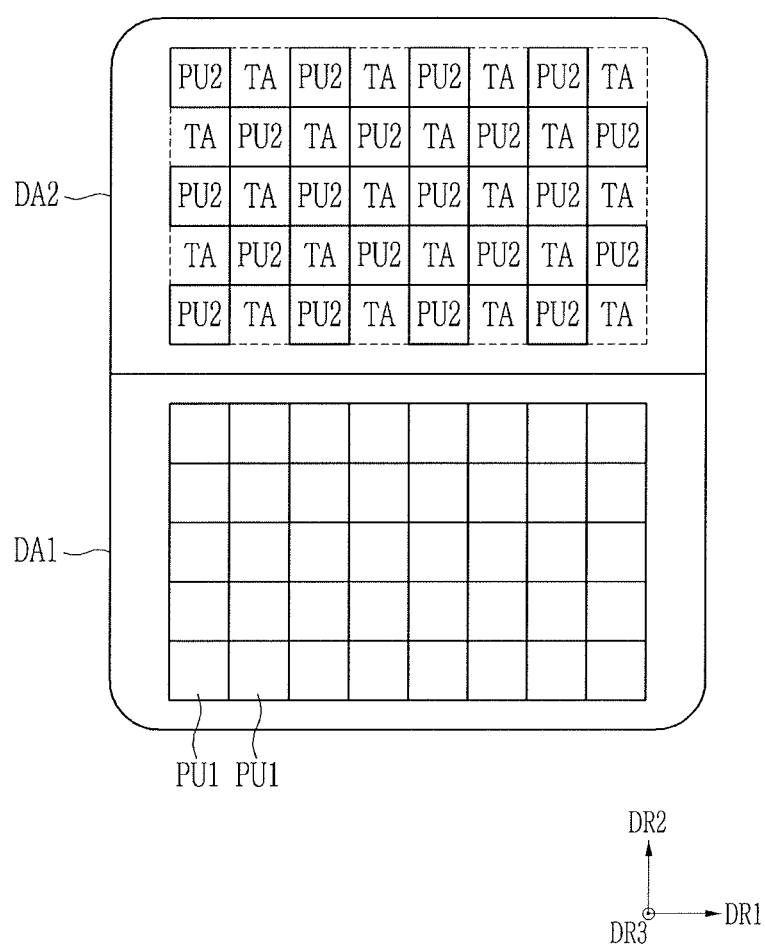

Referring to FIG. 6, the display device according to the present exemplary embodiment is the same as most of the display device according to the exemplary embodiment shown in FIG. 5, except for the structure of the second display area DA2. The following description focuses on differences from the exemplary embodiment described above and omits the same description of the same constituent elements.

In the second display area DA2, the light transmitting area TA may be placed between two pixel areas PU2 neighboring in the first direction DR1 or the second direction DR2. That is, the pixel area PU2 and the light transmitting area TA may be alternately arranged in the first direction DR1 and the second direction DR2. In the diagonal direction, the plurality of pixel areas PU2 may be arranged adjacent to each other.

Figure 7:
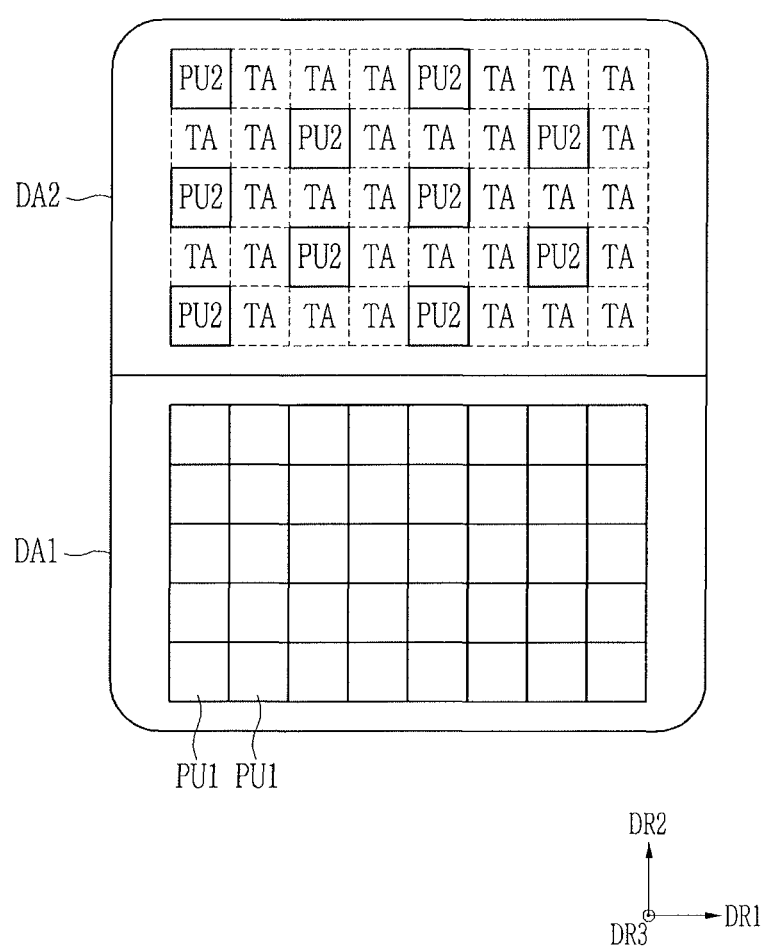

Referring to FIG. 7, the display device according to the present exemplary embodiment is the same as most of the display device according to the exemplary embodiment shown in FIG. 5, except for the structure of the second display area DA2. In detail, in the second display area DA2 shown in FIG. 5, the pixel areas PU2 in the odd-numbered columns, e.g., first, third, fifth, etc., may be positioned by being shifted by one row, while alternating in the odd-numbered columns with the unit light transmitting areas TA. That is, the plurality of pixel areas PU2 located in two neighboring columns may be arranged in a zigzag form, while the even-numbered columns, e.g., second, fourth, sixth, etc., may only include unit light transmitting areas TA. Thus, three unit light transmitting areas TA may be between two pixel areas PU2 neighboring in the first direction DR1, and one unit light transmitting area TA may be between two pixel areas PU2 neighboring in the second direction DR2.

Figure 8:
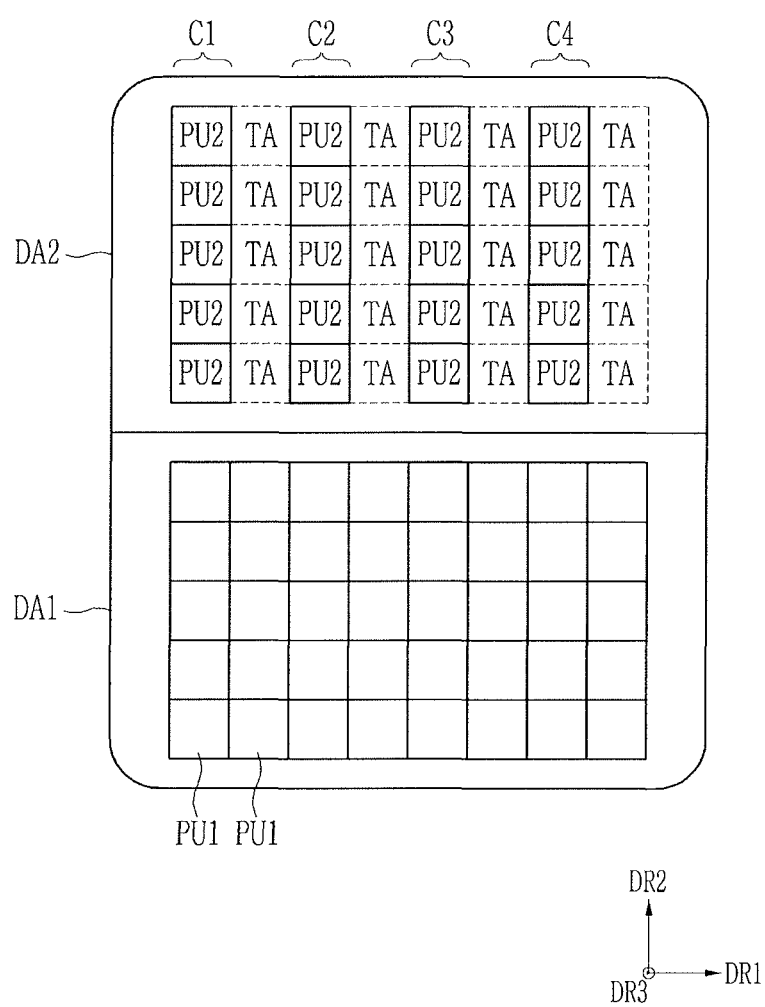

Referring to FIG. 8, the display device according to the present exemplary embodiment is the same as most of the display device according to the exemplary embodiment shown in FIG. 5, except for the structure of the second display area DA2.

In the second display area DA2, the plurality of pixel areas PU2 may be arranged in a plurality of columns C1, C2, C3, and C4 separated from each other. A plurality of light transmitting areas TA may be includes columns between the plurality of columns C1, C2, C3, and C4, and separated from each other. The columns of the pixel area PU2 and the columns of the light transmitting area TA may be alternately disposed. For example the columns of the pixel area PU2 and the columns of the light transmitting area TA, each extending in the second direction DR2, may alternate along in the first direction DR1. In other words, the second pixels areas may form a plurality of first columns and the light transmitting areas TA may form a plurality of second columns, the first and second columns alternating along in the first direction DR1.

In particular, each of the columns C1, C2, C3, and C4 of the pixel area PU2, may include a plurality of pixel areas PU2 arranged in the second direction DR2. Between two adjacent columns C1, C2, C3, and C4, a plurality of unit light transmitting area TA arranged in the second direction DR2 may be provided. In each of the columns C1, C2, C3, and C4, the light transmitting area TA may not be between two pixel areas PU2 neighboring in the second direction DR2.

Figure 9:
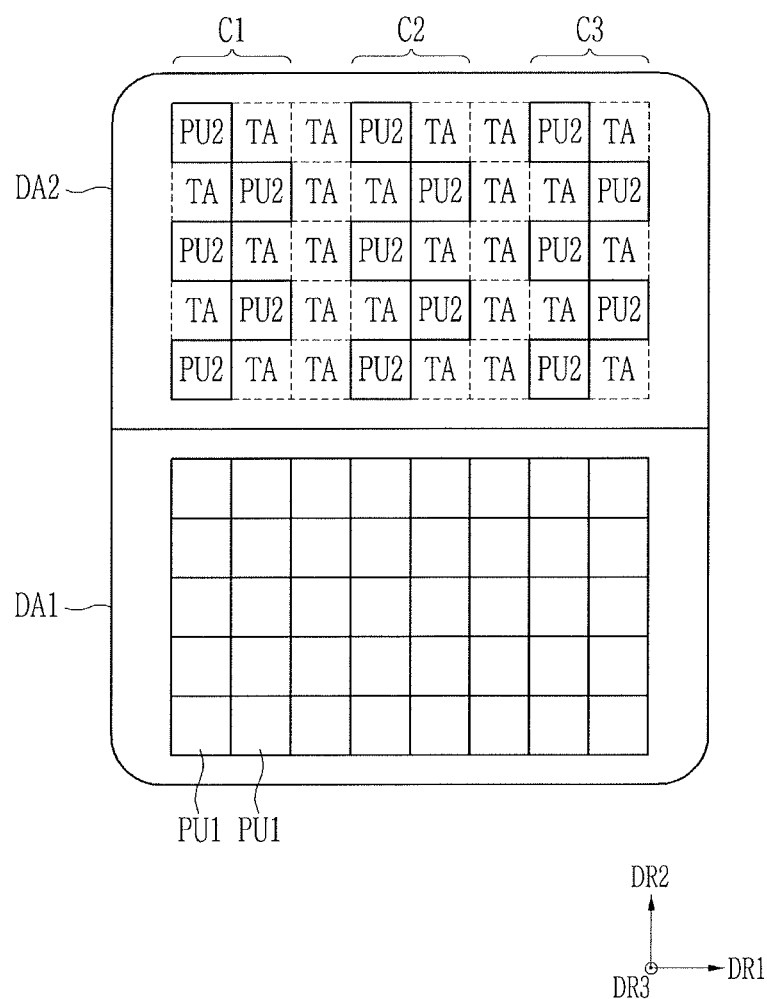

Referring to FIG. 9, the display device according to the present exemplary embodiment is the same as most of the display device according to the exemplary embodiment shown in FIG. 8, except for the structure of the second display area DA2.

In the second display area, each of the plurality of columns C1, C2, and C3 arranged in the second direction DR2 may include a plurality of pixel areas PU2 and a plurality of unit light transmitting areas TA arranged in the zigzag shape in the left and right directions. In each column C1, C2, and C3, a pair of the left pixel area PU2 and the right unit light transmitting area TA, and a pair of the left unit light transmitting area TA and the right pixel area PU2 may be alternately arranged in the second direction DR2. The plurality of unit light transmitting areas TA arranged in the second direction DR2 or one continuous light transmitting area TA extending along in the second direction DR2 may be between two neighboring columns of C1, C2, and C3.

Figure 10:
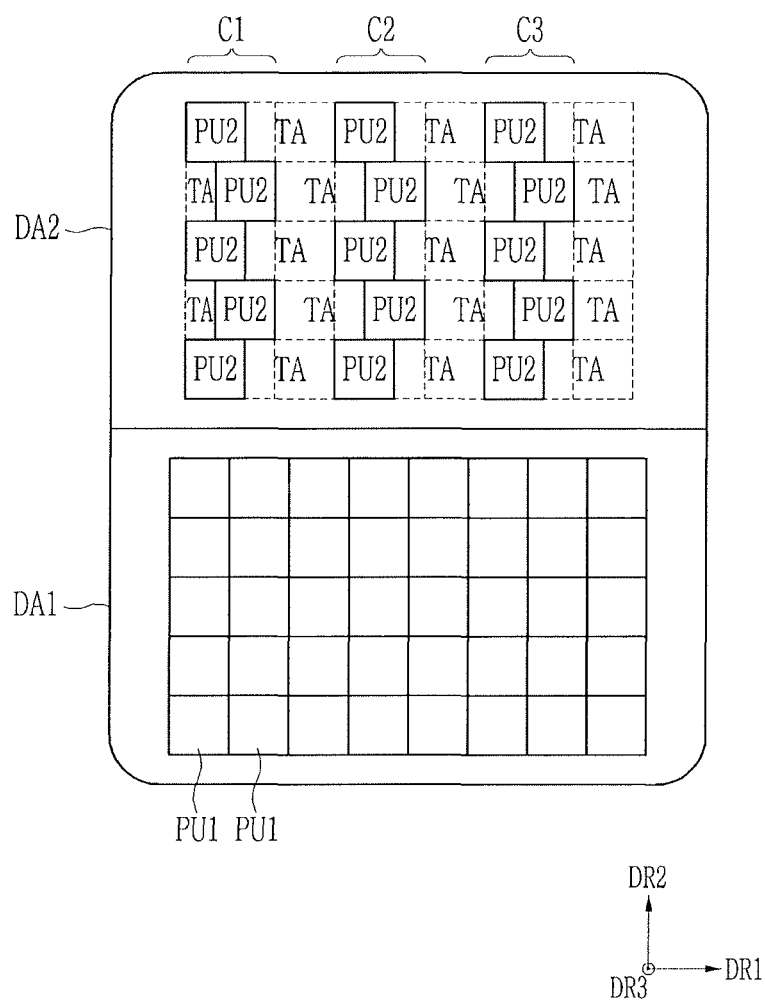

Referring to FIG. 10, the display device according to the present exemplary embodiment is the same as most of the display device according to the exemplary embodiment shown in FIG. 9, except for the structure of the second display area DA2.

In the second display area DA2, each of the plurality of columns C1, C2, and C3 may include the plurality of pixel areas PU2 arranged in the second direction DR2 with the zigzag in the right and left directions, and two pixel areas PU2 neighboring in the second direction DR2 may partially overlap in the second direction DR2. That is, in each column C1, C2, and C3, two pixel areas PU2 in adjacent rows may share a part of the edge. Thus, the width of one column of C1, C2, and C3 in the first direction DR1 may be less than the width of one column of C1, C2, and C3 in the first direction DR1 than in the exemplary embodiment shown in FIG. 9.

A plurality of unit light transmitting area TA forming one column may be between two adjacent columns of C1, C2, and C3. The plurality of unit light transmitting areas TA in one column may be protrude in the right and left directions along the first direction DR1 with the zigzag shape. Two unit light transmitting area TA neighboring in the second direction DR2 may partially overlap in the second direction DR2. That is, in each column, the unit light transmitting areas TA adjacent in the second direction DR2 may partially share edges.

Figure 11:
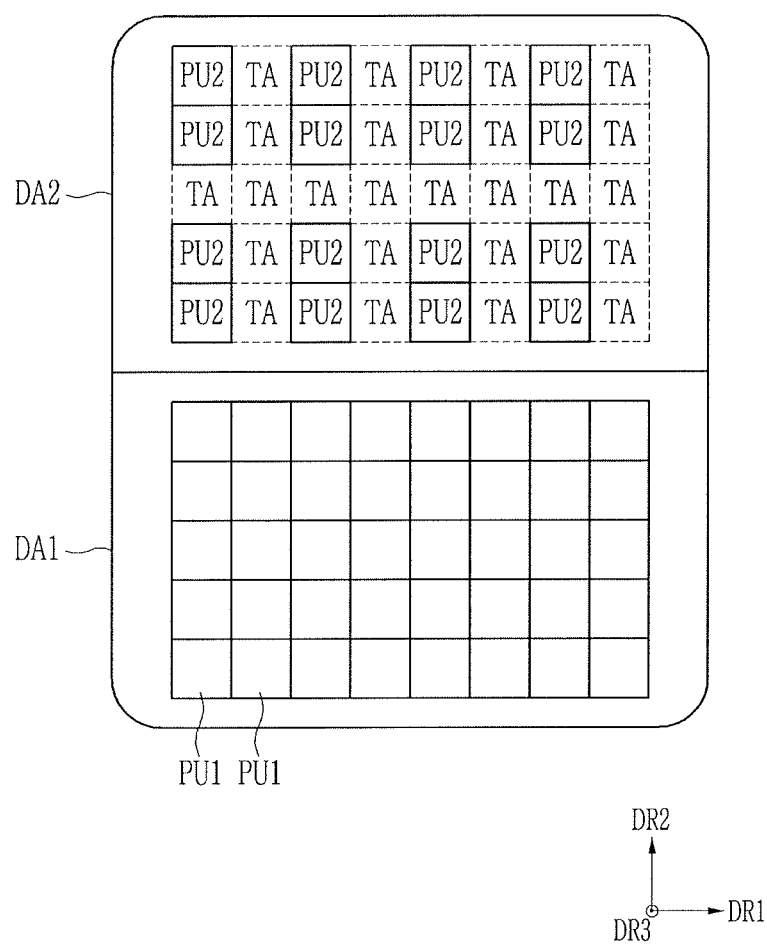

Referring to FIG. 11, the plurality of adjacent pixel areas PU2 form one group, and the plurality of groups may be arranged to be separated from each other in the first direction DR1 and the second direction DR2 via the light transmitting area TA. FIG. 11 shows an example in which one group includes two pixel areas PU2 adjacent in the second direction DR2 and are separated along the first direction Dri by a column of unit light transmitting areas TA and along the second direction DR2 by a row of unit light transmitting areas TA.

Figure 12:
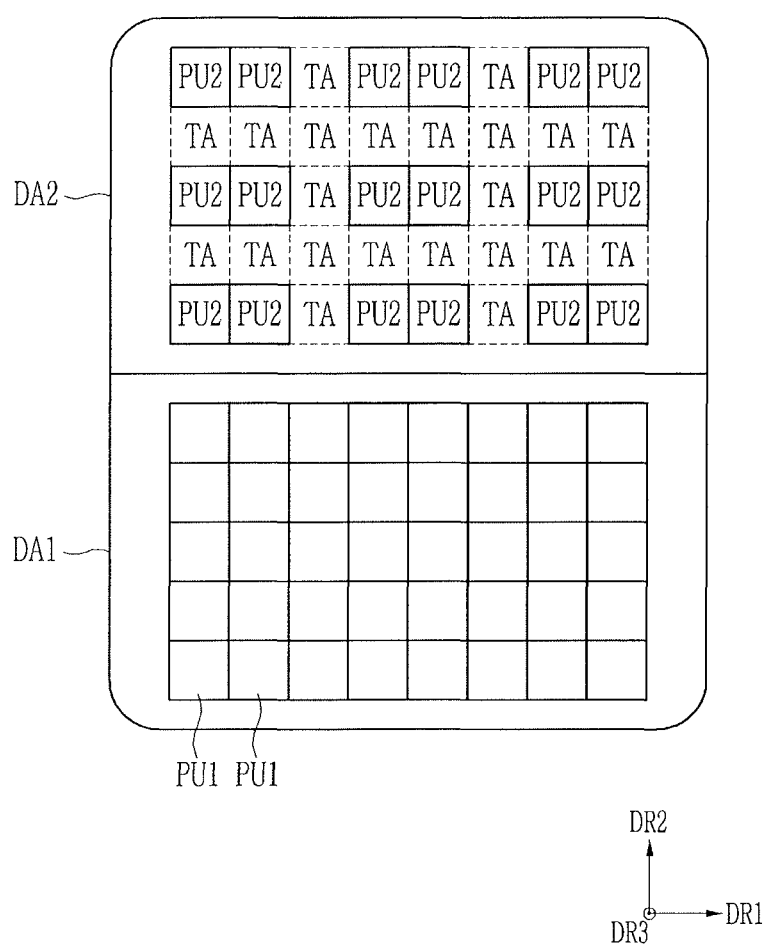
Figure 34:
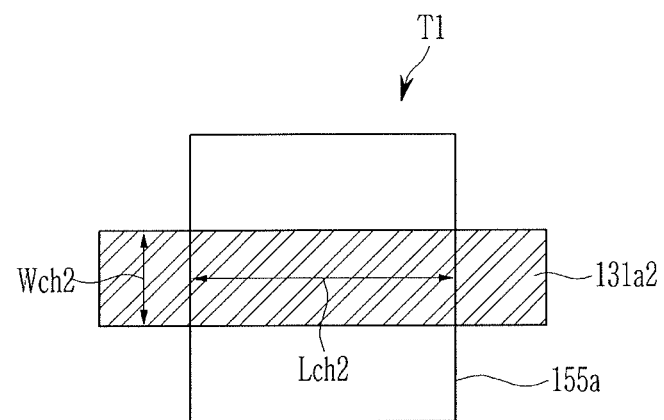
FIG. 34 and FIG. 35 illustrate schematic layout views of a transistor in a display area of a display device according to an exemplary embodiment, respectively.
Figure 35:
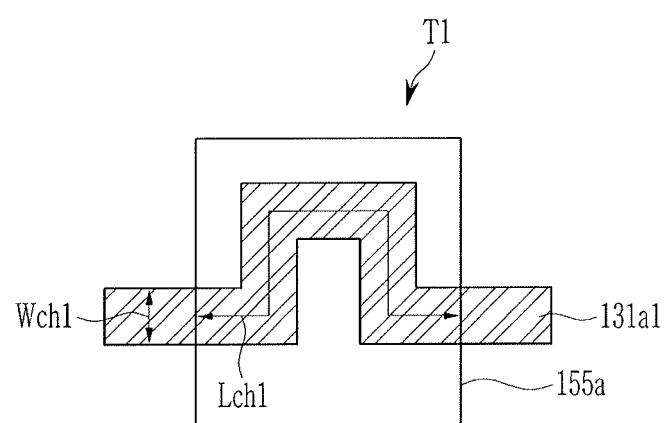

Referring to FIG. 12, the display device according to the present exemplary embodiment is the same as most of the display device according to the exemplary embodiment shown in FIG. 11, however one group arranged to be separated from each other via the light transmitting area TA includes two pixel areas PU2 adjacent in the first direction DR1. The two pixel areas PU2 adjacent in the first direction DR1 are separated along the first direction DR1 by a column of unit light transmitting areas TA and along the second direction DR2 by a row of unit light transmitting areas TA The detailed structure of the first display area DA1 and the second display area DA2 of the display device according to an exemplary embodiment is described with reference to FIG. 21 to FIG. 35 along with the above-described exemplary embodiments. FIG. 21 to FIG. 33 are layout views of a display area of a display device according to an exemplary embodiment, respectively. FIG. 34 and FIG. 35 are schematic layout views of a transistor in a display area of a display device according to an exemplary embodiment, respectively.

Figure 21:
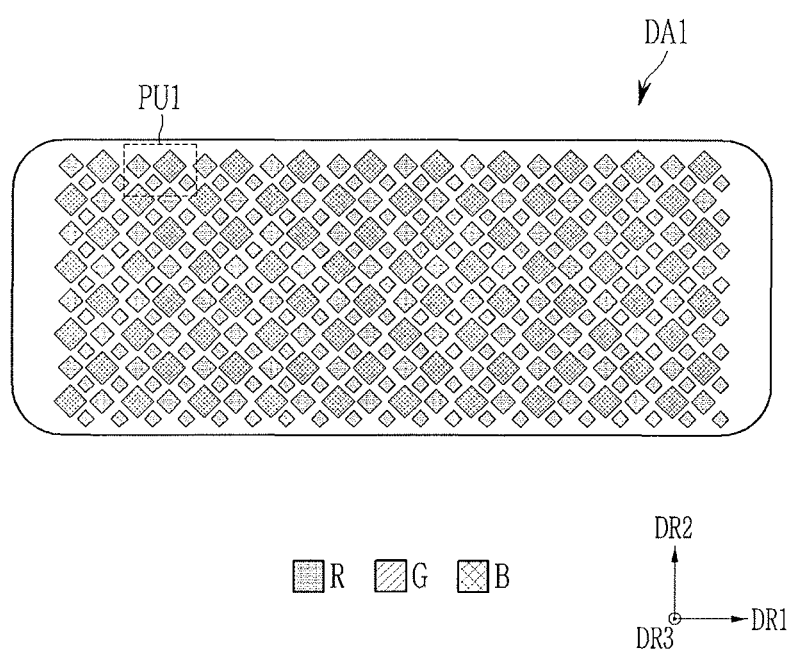
FIG. 21 to FIG. 33 illustrate layout views of a display area of a display device according to an exemplary embodiment, respectively.

Referring to FIG. 21, a part of the plurality of pixel areas PU1 included in the first display area DA1 of the display device according to an exemplary embodiment is the pixel area PUd of FIG. 16 as above-described, and the remaining part may be the same as the pixel area PUf of FIG. 18. In detail, in the first display area DA1, the pixel area PUd and the pixel area PUf are alternately arranged in the second direction DR2, the pixel area PUd is repeatedly arranged in the first direction DR1 in each row, or the pixel area PUf is repeatedly arranged in the first direction DR1.

In other words, in the first display area DA1, the red pixel (R) and the blue pixel (B) are alternately arranged in the first direction DR1 and the second direction DR2, the red pixel (R) and the green pixel (G) are alternately arranged in one diagonal direction, and the blue pixel (B) and the green pixel (G) are alternately arranged in the other diagonal direction.

Figure 22:
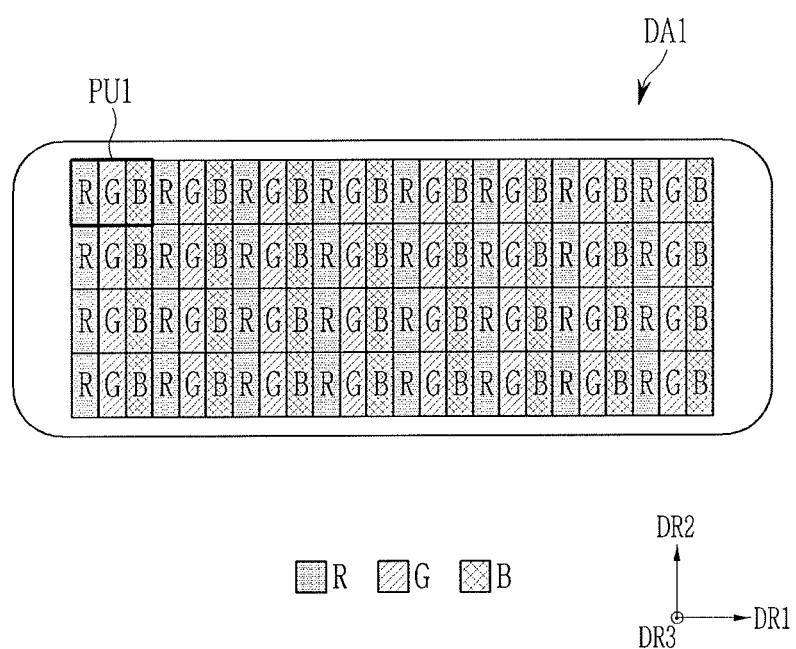

Referring to FIG. 22, the plurality of pixel areas PU1 included in the first display area DA1 of the display device according to an exemplary embodiment may be the pixel area PUa shown in FIG. 13 as above-described. Specifically, the red pixels (R) may be arranged in the second direction DR2 in the pixel column containing the red pixel (R), the green pixels (G) may be arranged in the second direction DR2 in the pixel column containing the green pixel (G), and the blue pixels (B) may be arranged in the second direction DR2 in the pixel column containing the blue pixel (B). The pixel column containing the red pixel (R), the pixel column containing the green pixel (G), and the pixel column containing the blue pixel (B) may be repeatedly arranged in the first direction DR1.

Figure 23:
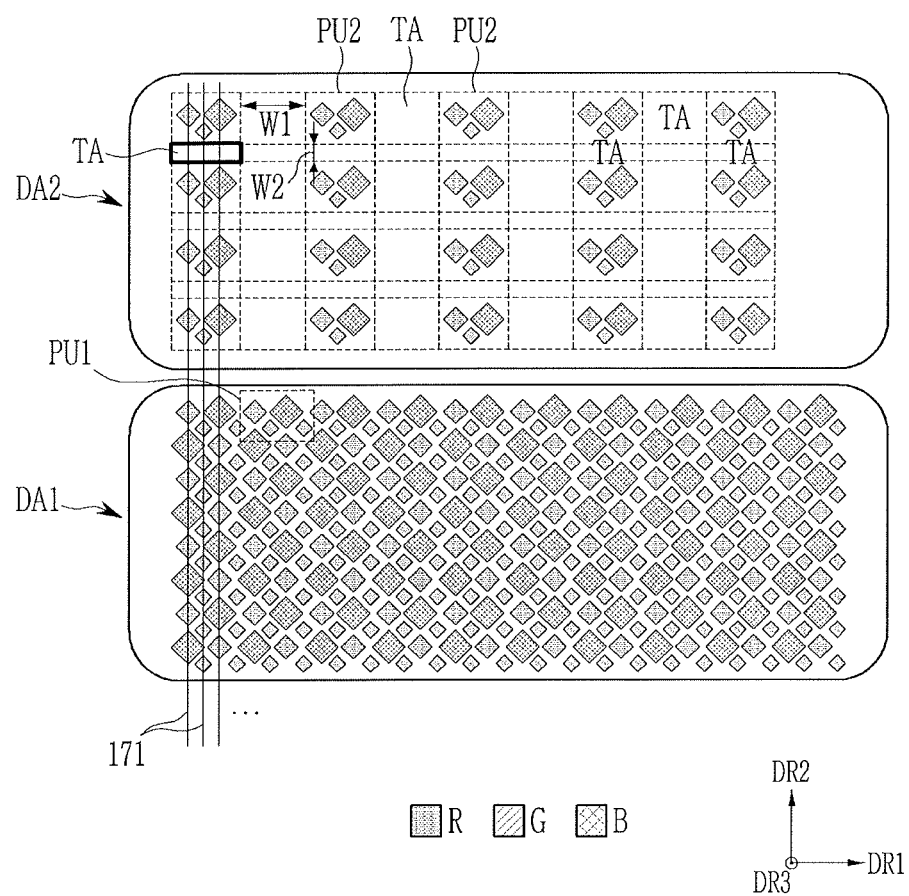

Referring to FIG. 23, the second display area DA2 of the display device according to an exemplary embodiment may include the part adjacent to the first display area DAL. As explained earlier, the structure or shape of the pixel area PU1 of the first display area DA1 and the structure or shape of the pixel area PU2 of the second display area DA2 may be different or the same. FIG. 23 shows an example in which the structure or shape of the pixel area PU1 of the first display area DA1 and the structure or shape of the pixel area PU2 of the second display area DA2 are different.

The first display area DA1 may have the same structure as the exemplary embodiment of FIG. 21 as above-described. The plurality of pixel areas PU2 included in the second display area DA2 may include the pixel areas PUc and PUe shown in FIG. 15 or FIG. 17 as above-described. The arrangement shape of the pixel area PU2 and the light transmitting area TA of the second display area DA2 may be the same as the exemplary embodiment of FIG. 5 as above-described.

A distance W1 between two pixel areas PU2 adjacent in the first direction DR1 via the light transmitting area TA in the second display area DA2 may be the same as or different from the width of one pixel area PU2 in the first direction DR1. The distance W2 between two pixel areas PU2 adjacent in the second direction DR2 via the light transmitting area TA may be the same as or different from the width of one pixel area PU2 in the second direction DR2. Also, the distance W1 may be greater than or the same as the distance W2, but is not limited to this, and they may be the same.

The display device according to an exemplary embodiment may include a plurality of data lines 171 transmitting the data signals. Each data line 171 may extend long in the second direction DR2, for example, and one data line 171 may pass both of the first display area DA1 and the second display area DA2.

For example, the leftmost data line 171 may be connected to the transistors of the corresponding pixels (R and B) while passing through the red pixel (R) and the blue pixel (B) alternately arranged in the second direction DR2 in the first display area DA1, and this data line 171 may be connected to the transistor of the corresponding red pixel (R) while passing through the red pixel (R) of the pixel area PU2 in the second display area DA2.

In the left side, the second data line 171 may be connected to the transistor of the corresponding green pixel (G) while passing through the green pixel (G) arranged in the second direction DR2 in the first display area DA1, and this data line 171 may be connected to the transistor of the corresponding green pixel (G) while passing through the green pixel (G) of the pixel area PU2 in the second display area DA2.

In the left side, the third data line 171 may be connected to the transistors of the corresponding pixels (B and R) while passing through the blue pixel (B) and the red pixel (R) alternately arranged in the second direction DR2 in the first display area DA1, and this data line 171 may be connected to the transistor of the corresponding blue pixel (B) while passing through the blue pixel (B) of the pixel area PU2 in the second display area DA2.

In the left side, the fourth data line 171 may be connected to the transistor of the corresponding pixel (G) while passing through the green pixel (G) arranged in the second direction DR2 in the first display area DA1, and this data line 171 may or may not be connected to the transistor while passing through light transmitting area TA in the second display area DA2.

By this method, the plurality of data lines 171 transmitting the data signal to the first display area DA1 may also extend in the second display area DA2 adjacent to the first display area DA1, thereby also transmitting the data signal to the pixel area PU2 of the second display area DA2. If the transistor is formed in the light transmitting area TA, the data line 171 passing the light transmitting area TA of the second display area DA2 may be connected to the transistor, however the normal pixel is not formed such that the light of the image may not be emitted.

Figure 24:
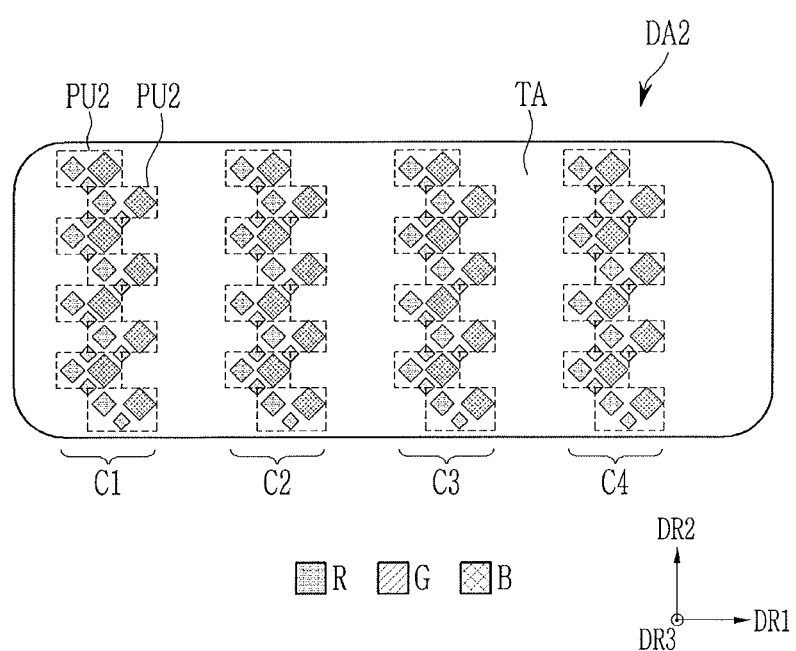

Referring to FIG. 24, the first display area DA1 of the display device according to an exemplary embodiment may be the same as that of the exemplary embodiment shown in FIG. 23 or the exemplary embodiment shown in FIG. 22 as above-described. The structure of such a first display area DA1 may be equally applied to an exemplary embodiment to be described later.

The plurality of pixel areas PU2 included in the second display area DA2 according to an exemplary embodiment may include the pixel areas PUc and PUe shown in FIG. 15 or FIG. 17 as above-described. The arrangement shape of the pixel area PU2 and the light transmitting area TA of the second display area DA2 may be almost the same as the exemplary embodiment of FIG. 10 described above.

The pixel area PU2 may be formed with the zigzag in the right and left directions while being toward the second direction DR2 and the green pixel (G) may be on the boundary between two pixel areas PU2 adjacent in the second direction DR2.

Figure 25:
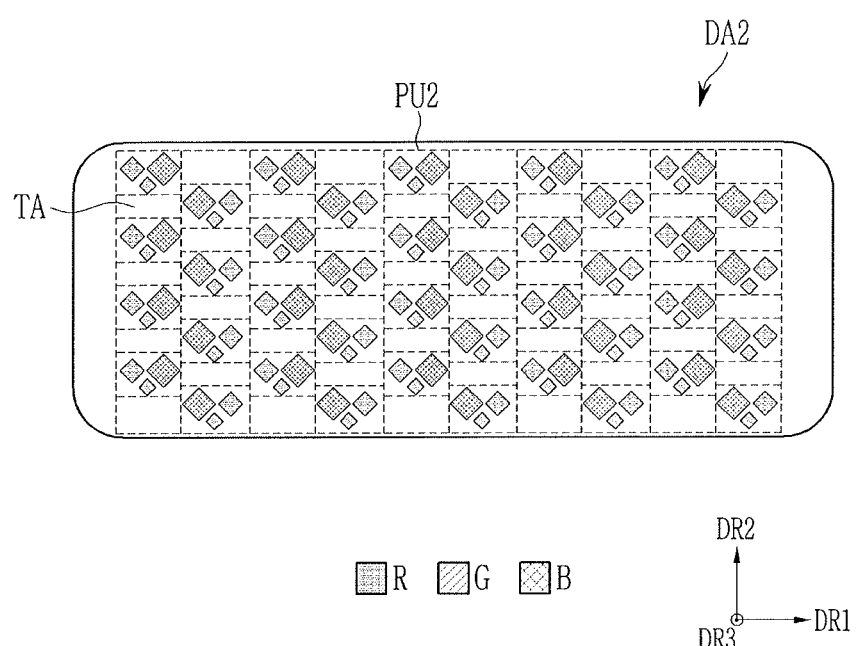

Next, referring to FIG. 25, the part of the plurality of pixel areas PU2 included in the second display area DA2 of the display device according to an exemplary embodiment may be the pixel area PUc of FIG. 15 above, and the remaining part may be the pixel area PUe shown in FIG. 17. The arrangement shape of the pixel area PU2 and the light transmitting area TA of the second display area DA2 may be almost the same as the exemplary embodiment of FIG. 6 described above.

In the second display area DA2, the plurality of light transmitting areas TA may be regularly arranged to be separated in the first direction DR1 and the second direction DR2.

Figure 26:
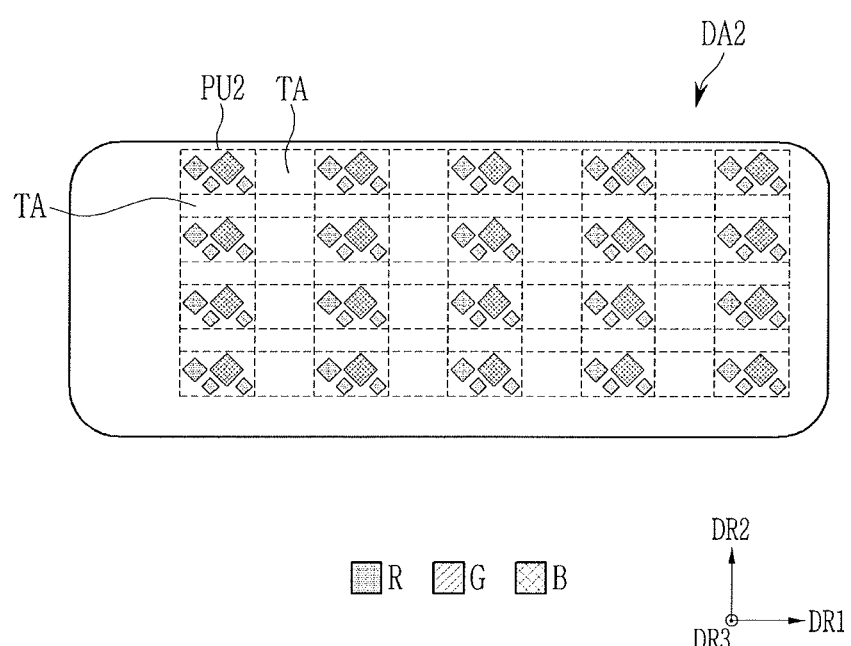

Next, referring to FIG. 26, the plurality of pixel areas PU2 included in the second display area DA2 of the display device according to an exemplary embodiment may be the pixel areas PUd and PUf of FIG. 16 or FIG. 18 described above. The arrangement shape of the pixel area PU2 and the light transmitting area TA of the second display area DA2 may be almost the same as the exemplary embodiment of FIG. 5 described above.

Figure 27:
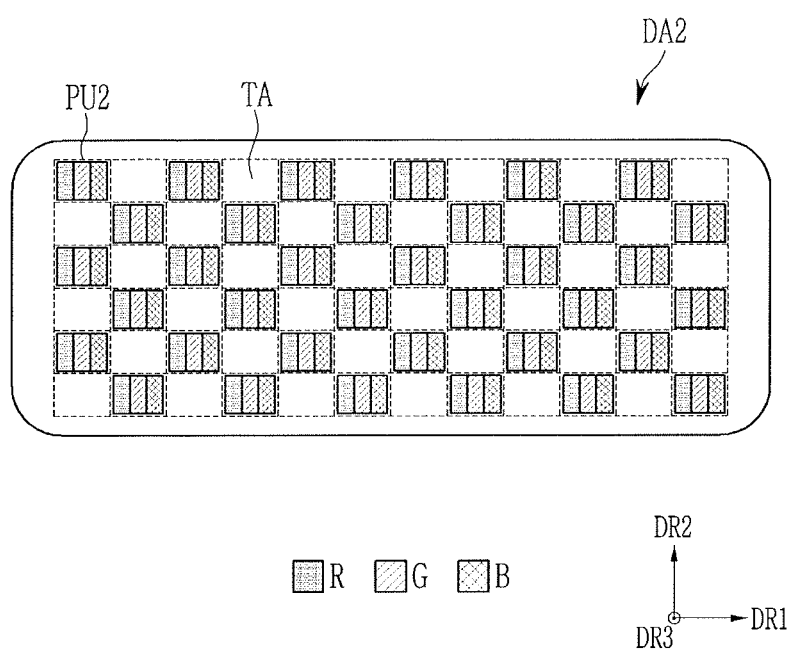

Next, referring to FIG. 27, the plurality of pixel areas PU2 included in the second display area DA2 of the display device according to an exemplary embodiment may be the pixel area PUa shown in FIG. 13 described above. The arrangement shape of the pixel area PU2 and the light transmitting area TA of the second display area DA2 may be almost the same as the exemplary embodiment of FIG. 6 described above.

Figure 28:
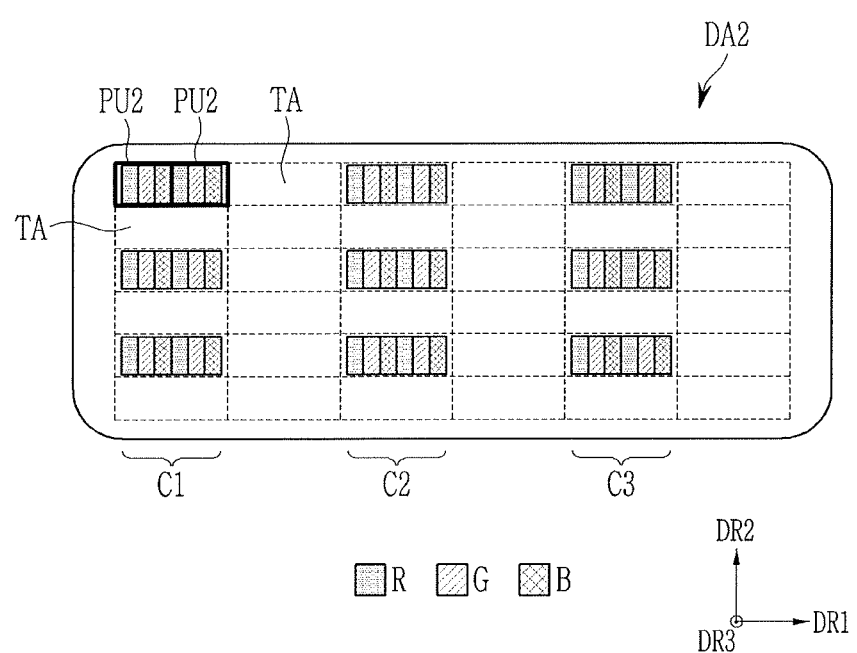

Next, referring to FIG. 28, the plurality of pixel areas PU2 included in the second display area DA2 of the display device according to an exemplary embodiment may include the pixel area PUa of FIG. 13 described above. The arrangement shape of the pixel area PU2 and the light transmitting area TA of the second display area DA2 may be almost the same as the exemplary embodiment of FIG. 12 described above.

The plurality of pixel areas PU2 may be arranged while forming the plurality of columns C1, C2, and C3, and the plurality of unit light transmitting areas TA arranged in the second direction DR2 or the light transmitting area TA extending long in the second direction DR2 may be between two adjacent columns of C1, C2, and C3. In each column C1, C2, and C3, the light transmitting area TA may also be between two pixel areas PU2 adjacent in the second direction DR2.

Figure 29:
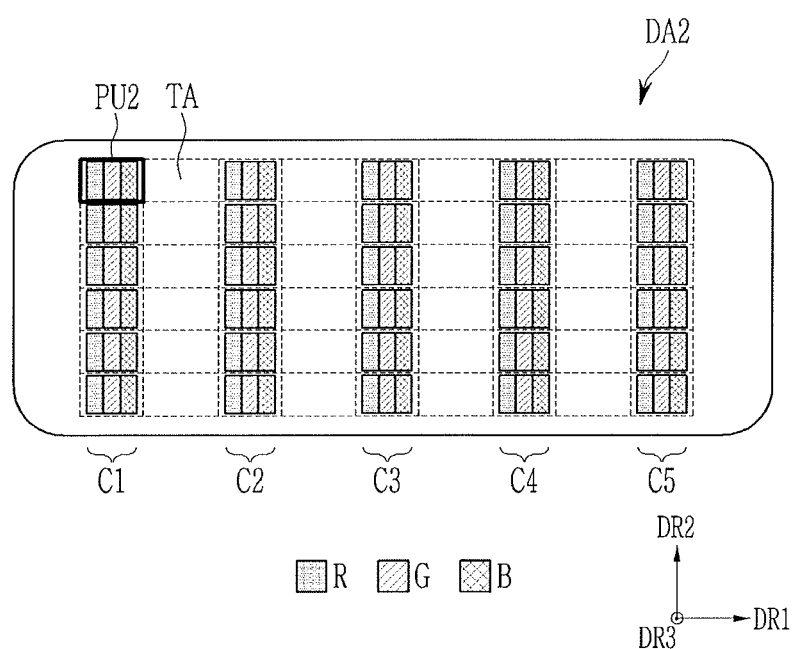

Next, referring to FIG. 29, the plurality of pixel areas PU2 included in the second display area DA2 of the display device according to an exemplary embodiment may include the pixel area PUa of FIG. 13 described above. The arrangement shape of the pixel area PU2 and the light transmitting area TA of the second display area DA2 may be almost the same as the exemplary embodiment of FIG. 8 described above.

Figure 30:
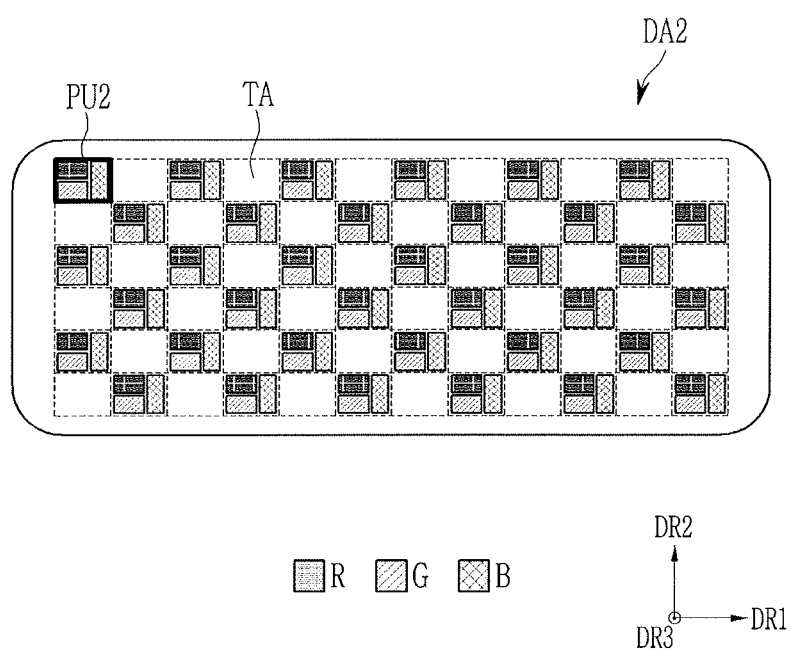

Next, referring to FIG. 30, the plurality of pixel areas PU2 included in the second display area DA2 of the display device according to an exemplary embodiment may include the pixel area PUb of FIG. 14 described above. The arrangement shape of the pixel area PU2 and the light transmitting area TA of the second display area DA2 may be almost the same as the exemplary embodiment of FIG. 6 described above.

Figure 31:
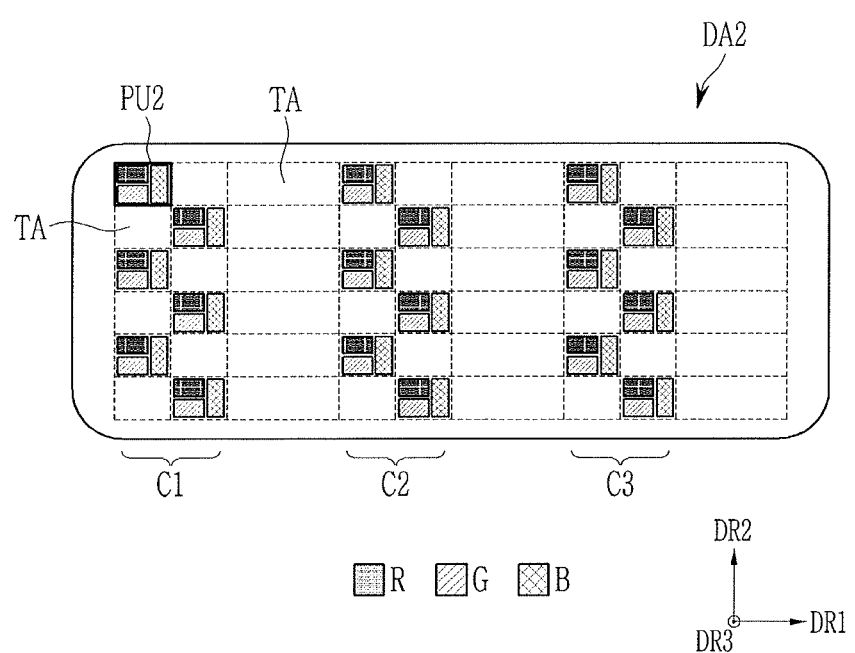

Next, referring to FIG. 31, the plurality of pixel areas PU2 included in the second display area DA2 of the display device according to an exemplary embodiment may include the pixel area PUb of FIG. 14 described above. The arrangement shape of the pixel area PU2 and the light transmitting area TA of the second display area DA2 may be almost the same as the exemplary embodiment of FIG. 9 described above.

Figure 32:
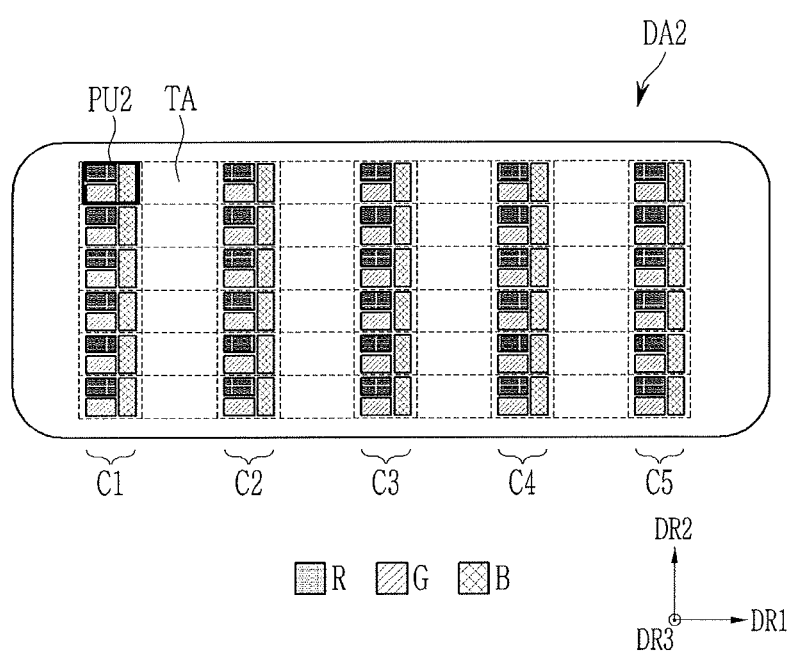

Next, referring to FIG. 32, the plurality of pixel areas PU2 included in the second display area DA2 of the display device according to an exemplary embodiment may include the pixel area PUb of FIG. 14 described above. The arrangement shape of the pixel area PU2 and the light transmitting area TA of the second display area DA2 may be almost the same as the exemplary embodiment of FIG. 8 described above.

Figure 33:
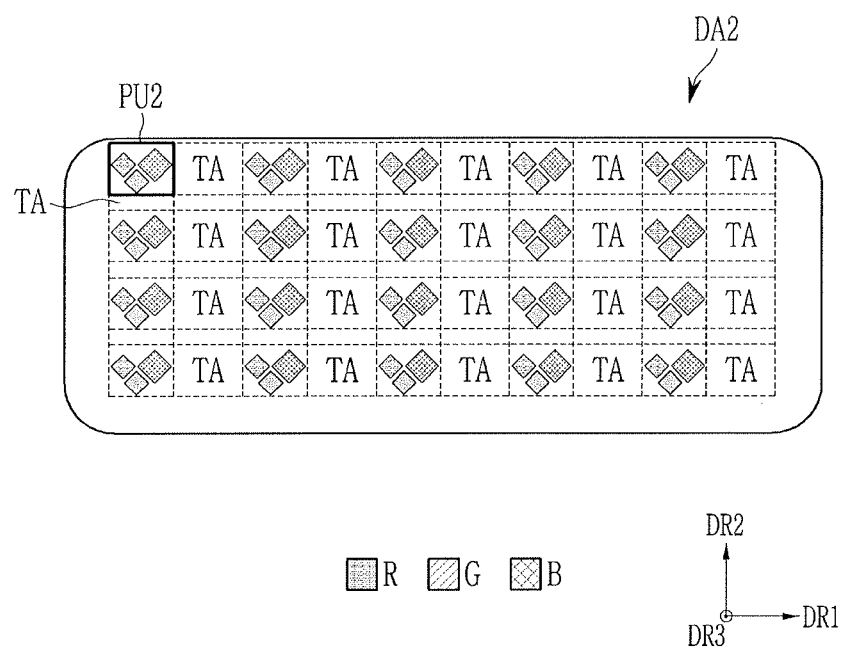

Next, referring to FIG. 33, the shape and the arrangement shape of the pixel area PU2 in the second display area DA2 of the display device according to an exemplary embodiment may be almost the same as the several exemplary embodiments shown in FIG. 23 to FIG. 32 described above. FIG. 33 shows an example in which the second display area DA2 has the similar shape to the exemplary embodiment shown in FIG. 23 described above. However, unlike the exemplary embodiment shown in FIG. 23, the planar size of the green pixel (G) included in the pixel area PU2 according to the present exemplary embodiment may be extended more than the green pixel (G) of the exemplary embodiment shown in FIG. 23 to be the same as, similar to, or slightly smaller than the planar size of the red pixel (R).

As above-described, to prevent the deterioration of the quality of the image, when the pixel area PU2 of the second display area DA2 includes one red pixel (R), one green pixel (G), and one blue pixel (B) to form the plane shape of one dot to be close to the square, if only one green pixel (G) having a relatively small size is included in one pixel area PU2, the lifetime of the green pixel (G) may be relatively low. However, according to the present exemplary embodiment, the size of the green pixel (G) is made equal to or similar to the size of the red pixel (R), thereby at least matching the lifetime of the green pixel (G) with that of the red pixel.

FIG. 34 shows a gate electrode 155a and an active pattern 131a2 of the transistor T1 included in the pixel in the second display area DA2, and FIG. 35 shows the gate electrode 155a and an active pattern 131a1 of the transistor T1 included in the pixels R, G, and B in the first display area DAL. Part of the active patterns 131a1 and 131a2 overlapping the gate electrode 155a on a plane may form the channel region of the transistor T1, and the region except for the channel region of the active patterns 131a1 and 131a2 may form the source region or the drain region of the transistor T1 as the conductive region.

Referring to FIG. 34 and FIG. 35, the channel length Lch2 of the channel region of the transistor T1 in the second display area DA2 may be shorter than the channel length Lch1 of the channel region of the transistor T1 in the first display area DA1. Additionally or separately, the channel width Wch2 of the channel region of the transistor T1 in the second display area DA2 may be larger than the channel width Wch1 of the channel region of the transistor T1 in the first display area DAL. Thus, the magnitude of the driving current flowing through the transistor T1 disposed in the second display area DA2 may be larger than the driving current flowing through the transistor T1 in the first display area DAL. In each pixel R, G, and B, the transistor T1 is connected to the light-emitting element such as the light emitting diode (LED) to flow the driving current to the light-emitting element, such that the light-emitting element may be emitted depending on the driving current.

As above-described, when the resolution of the second display area DA2 is lower than the resolution of the first display area DA1, the luminance of the image displayed in the second display area DA2 may be lower than the luminance of the image displayed in the first display area DA1. However, according to the present exemplary embodiment, since the magnitude of the driving current flowing through the transistor T1 in the second display area DA2 is larger than the driving current flowing through the transistor T1 in the first display area DA1, the luminance of the second display area DA2 may be adjusted to be closer to the luminance of the first display area DA1, thereby improving the quality of the displayed image.

The exemplary embodiment shown in FIG. 33 and the exemplary embodiment shown in FIG. 34 and FIG. 35 may be applied simultaneously to one display device or only one may be applied.

According to another exemplary embodiment, only the transistor T1 of the green pixel (G) in the second display area DA2 may have the structure of the FIG. 34, and the transistor T1 of the red pixel (R) and the blue pixel (B) of the second display area DA2 may have the structure of FIG. 35. In the pixel area PU2 of the second display area DA2, as in FIG. 15 or FIG. 17 described above, the planar size of the green pixel (G) may be smaller than the planar size of the red pixel (R) or the blue pixel (B). According to the present exemplary embodiment, in the second display area DA2, the magnitude of the driving current flowing through the transistor T1 and the light-emitting element of the green pixel (G) may be larger than the magnitude of the driving current flowing through the transistor T1 and the light-emitting element of the red pixel (R) or the blue pixel (B), and in the second display area DA2, the luminance of the green pixel (G) may be adjusted to be similar to the luminance of the red pixel (R) or the blue pixel (B). Thus, the quality of the image in the second display area DA2 may be improved.

Figure 36:
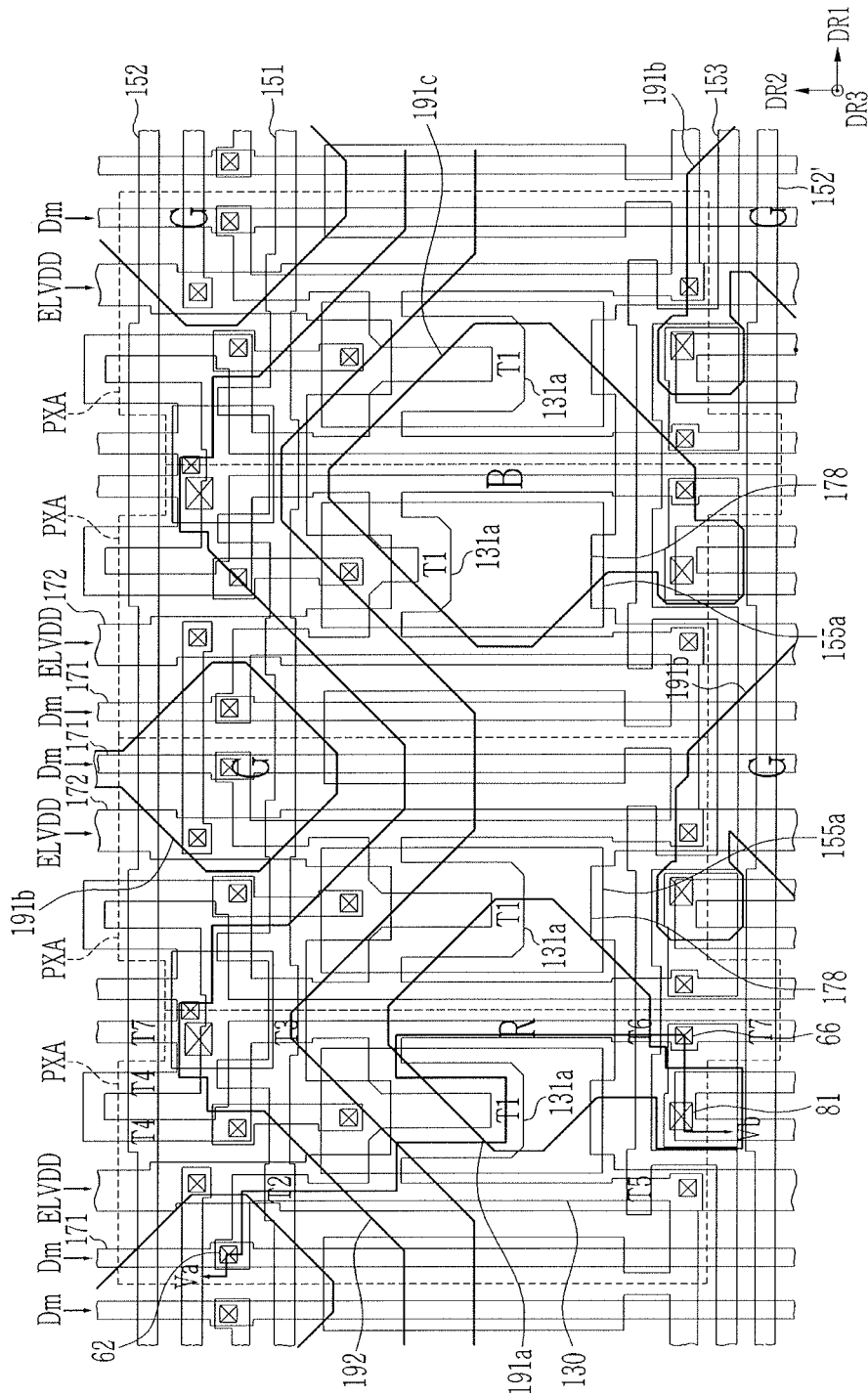
FIG. 36 illustrates a layout view of a display area of a display device according to an exemplary embodiment.
Figure 37:
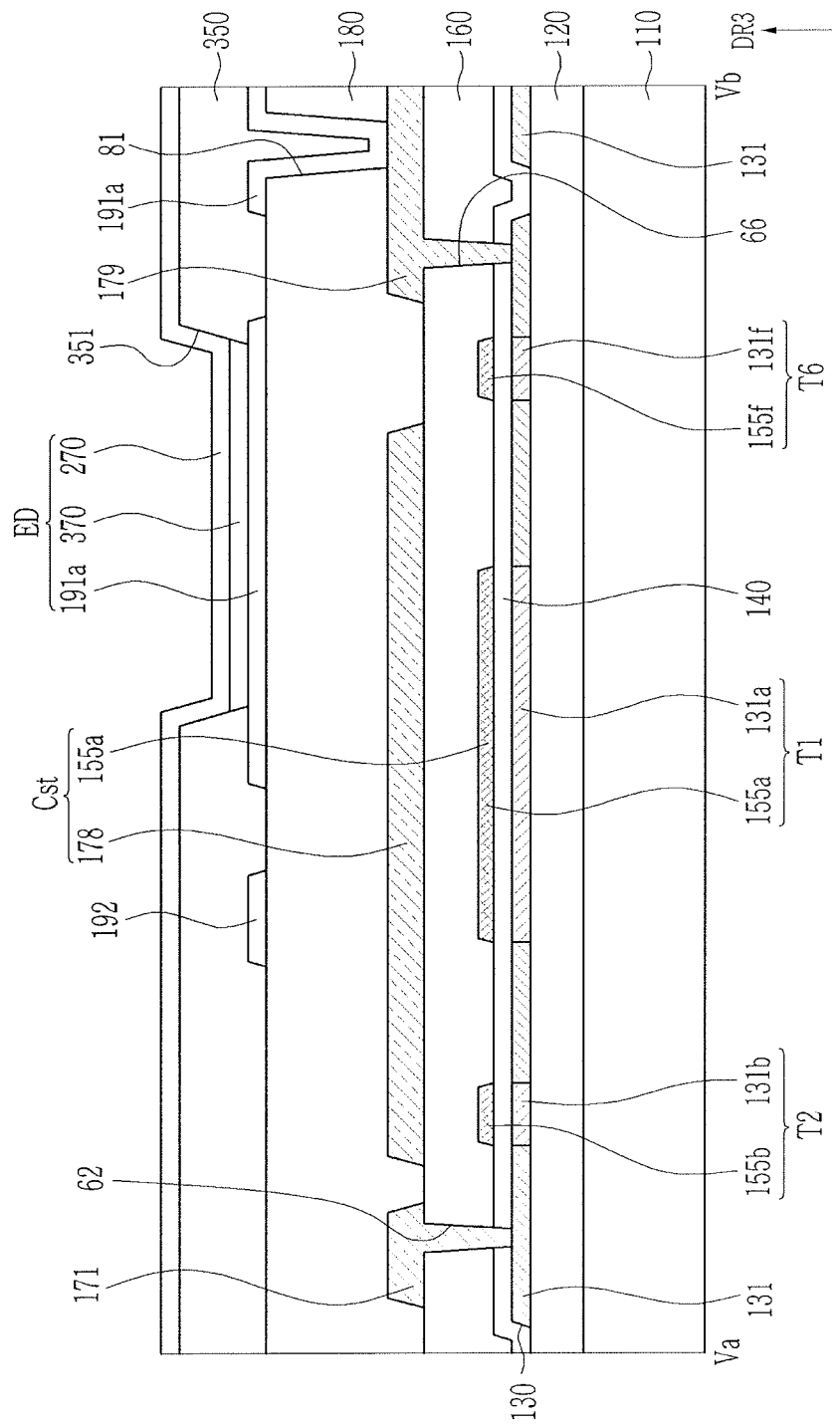
FIG. 37 illustrates a cross-sectional view of the display device shown in FIG. 36 taken along a line Va-Vb.

The structure of an example in which the display device according to an exemplary embodiment is an emissive display is described with reference to FIG. 36 and FIG. 37 along with the above-described drawings. FIG. 36 is a layout view of a display area of a display device according to an exemplary embodiment. FIG. 37 is a cross-sectional view of the display device shown in FIG. 36 taken along a line Va-Vb.

Referring to FIG. 36, the display device according to an exemplary embodiment may include a plurality of pixel circuit regions PXA in which the pixel circuits corresponding to the plurality of pixels R, G, and B are formed. The plurality of pixel circuit regions PXA may be arranged in the matrix shape in the first direction DR1 and the second direction DR2.

Each pixel circuit region PXA may include a plurality of transistors T1, T2, T3, T4, T5, T6, and T7 connected to a plurality of scan lines 151, 152, and 152', a control line 153, the data line 171, and a driving voltage line 172.

The plurality of scan lines 151, 152, and 152' may transmit the scan signal. The scan line 152 may transmit the scan signal of the previous stage of the scan line 151, and the scan line 152' may transmit the scan signal of the next stage of the scan line 152. A control line 153 may transmit the control signal, particularly a light emission control signal, capable of controlling the emission of the light emitting diode (LED) corresponding to the pixels R, G, and B.

The data line 171 may transmit the data signal Dm, and the driving voltage line 172 may transmit the driving voltage ELVDD. The driving voltage line 172 may include a plurality of expanding portions 178 extending in the first direction DR1.

Each channel of the plurality of transistors T1, T2, T3, T4, T5, T6, and T7 may be formed in an active pattern 130. The active pattern 130 may be curved in various shapes and may include a semiconductor material, e.g., an amorphous polysilicon or oxide semiconductor. For example, the transistor T1 may include a channel region 131a of the active pattern 130 that is curved at least once. The transistor T1 shown in FIG. 34 and FIG. 35 as above-described may be a transistor of the same kind as the transistor T1 shown in FIG. 36 and FIG. 37.

The display device according to an exemplary embodiment may include a plurality of pixel electrodes 191a, 191b, and 191c, and a voltage line 192 corresponding to each pixel circuit region PXA. Each pixel electrode 191a, 191b, and 191c may correspond to each pixel R, G, and B. The pixel electrode 191a of the red pixel (R) may be smaller than the pixel electrode 191c of the blue pixel (B), and the pixel electrode 191b of the green pixel (G) may be smaller than the pixel electrode 191a of the red pixel (R).

The voltage line 192 may be curved according to the edge of the adjacent pixel electrodes 191a, 191b, and 191c, and may transmit a predetermined voltage, e.g., an initialization voltage capable of initializing one node of the pixel circuit regions PXA.

The cross-sectional structure of the display device according to an exemplary embodiment is described with reference to FIG. 37 along with FIG. 36.

The display device according to an exemplary embodiment may include a substrate 110. A buffer layer 120 of an insulating material may be on the substrate 110, and the active pattern 130 may be thereon. The active pattern 130 may include channel regions 131a, 131b, and 131f, and a conductive region 131. The conductive region 131 may be on both sides of each of the channel regions 131a, 131b, and 131f, and may be the source region and the drain region of the corresponding transistor. A gate insulating layer 140 may be on the active pattern 130.

A first conductive layer including the plurality of scan lines 151, 152, and 152', the control line 153, and the driving gate electrode 155a may be on the gate insulating layer 140. The scan line 151 may comprise a gate electrode 155b overlapping the channel region 131b, and the scan line 153 may comprise a gate electrode 155f overlapping the channel region 131f.

An interlayer insulating layer 160 may be on the first conductive layer and the gate insulating layer 140.

At least one among the buffer layer 120, the gate insulating layer 140, and the interlayer insulating layer 160 may include an inorganic insulating material, e.g., a silicon nitride, a silicon oxide, a silicon oxynitride, or an organic insulating material.

The interlayer insulating layer 160 and the gate insulating layer 140 may include a contact hole 62 on the source region connected to the channel region 131b of the transistor T2 of the conductive region 131 of the active pattern 130, and a contact hole 66 on the drain region connected to the channel region 131f of the transistor T6 of the conductive region 131 of the active pattern 130.

A second conductive layer including the data line 171, the driving voltage line 172, and a connecting member 179 may be on the interlayer insulating layer 160. The data line 171 may be connected to the source region connected to the channel region 131b of the transistor T2 through the contact hole 62. The expanding portion 178 of the driving voltage line 172 overlaps the driving gate electrode 155a via the interlayer insulating layer 160, thereby forming a capacitor Cst. The connecting member 179 may be connected to the drain region connected to the channel region 131f of the transistor T6 through the contact hole 66.

At least one of the first conductive layer and the second conductive layer may include a metal, e.g., copper (Cu), aluminum (Al), molybdenum (Mo), titanium (Ti), tantalum (Ta), an alloy of at least two of these, and the like.

A passivation layer 180 may be on the second conductive layer and the interlayer insulating layer 160. The passivation layer 180 may include an organic insulating material such as a polyacrylate resin and a polyimide resin, and an upper surface of the passivation layer 180 may be substantially flat. The passivation layer 180 may include a contact hole 81 on the connecting member 179.

A third conductive layer including the pixel electrodes 191a, 191b, and 191c and the voltage line 192 may be on the passivation layer 180. Each pixel electrode 191a, 191b, and 191c may be connected to the connecting member 179 through the contact hole 81. The third conductive layer may include a semi-transmissive conductive material or a reflective conductive material.

An insulating layer 350 may be on the third conductive layer. The insulating layer 350 may include the organic insulating material and may have an opening 351 on each pixel electrodes 191a, 191b, and 191c.

An emission layer 370 may be on the pixel electrodes 191a, 191b, and 191c. The emission layer 370 may include a part in the opening 351 and a part on the insulating layer 350. The emission layer 370 may include an organic emission material or an inorganic emission material.

The common electrode 270 may be on the emission layer 370 and the insulating layer 350. The common electrode 270 may also be formed on the insulating layer 350. The common electrode 270 may include a conductive transparent material. For example, the common electrode 270 may include silver (Ag).

A common layer, e.g., a hole injection layer, a hole transport layer, an electron injection layer, an electron transport layer, and the like, may be between the insulating layer 350 and the common electrode 270, between the emission layer 370 and the common electrode 270, and/or between the emission layer 370 and the pixel electrodes 191a, 191b, and 191c. The common layer may be formed entirely in the first display area DA1 and the second display area DA2.

Each pixel electrode 191a, 191b, and 191c, the emission layer 370, and the common electrode 270 together form the light emitting diode (LED) ED of the light-emitting element. The common electrode 270 may be the cathode and the pixel electrodes 191a, 191b, and 191c may be the anode, or vice versa.

The first display area DA1 described above may have the structure shown in FIG. 36 and FIG. 37. The plane structure and the cross-sectional structure of the pixel area PU2 of the second display area DA2 may have the part of the structure shown in FIG. 36 and the cross-sectional stacking structure shown in FIG. 37.

In the light transmitting area TA of the second display area DA2, at least part of the configuration required for displaying the image of the structure shown in FIG. 36 and FIG. 37 is omitted. For example, at least part of at least one of the active pattern 130, the driving gate electrode 155a, the expanding portion 178 of the driving voltage line 172, the pixel electrodes 191a, 191b, and 191c, the emission layer 370, and the common electrode 270 may be omitted in the light transmitting area TA. Accordingly, the light transmittance in the light transmitting area TA may be higher than the light transmittance in the pixel area PU1 and PU2.

Figure 38:
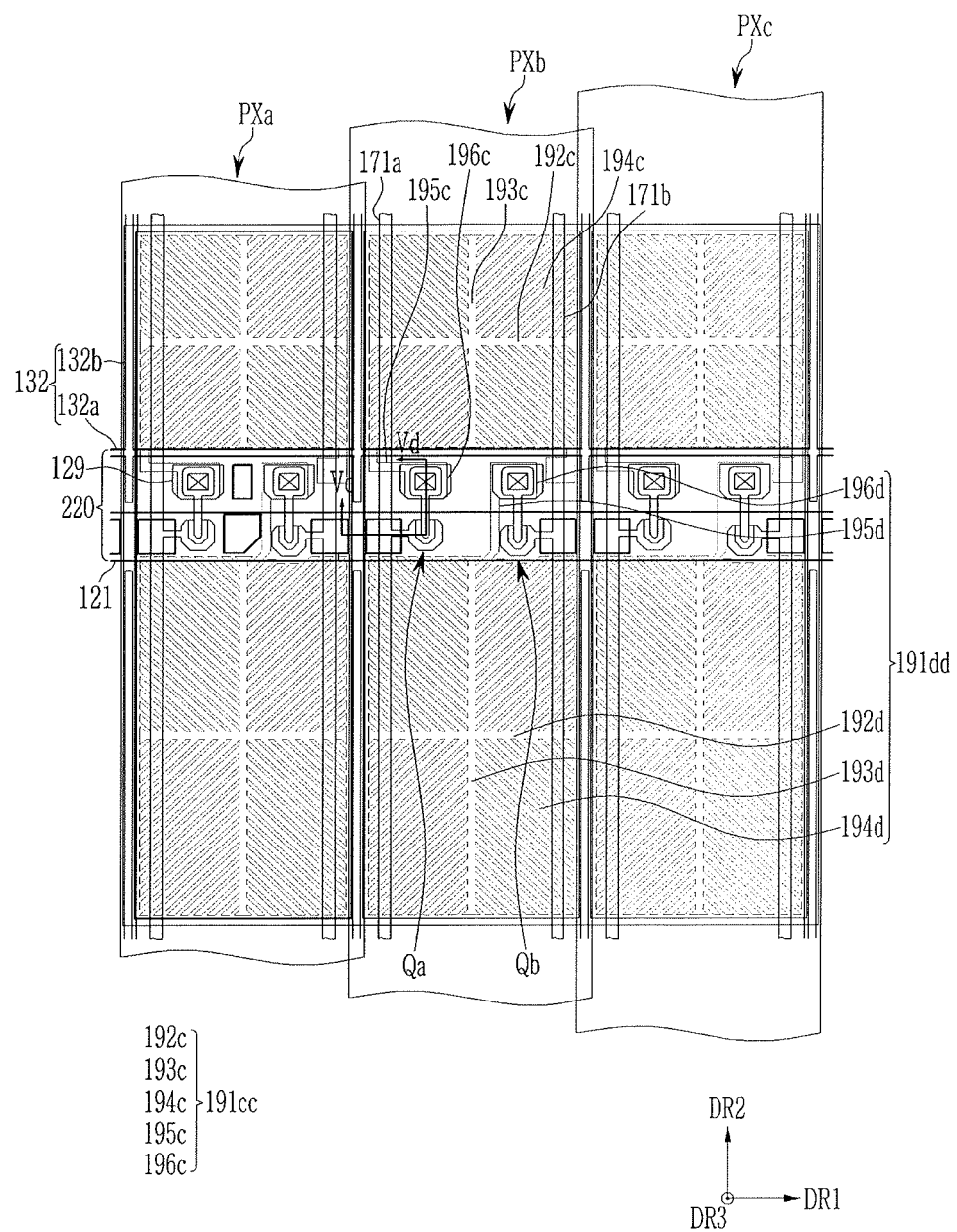
FIG. 38 illustrates a layout view of three adjacent pixels of a display device according to an exemplary embodiment.
Figure 39:
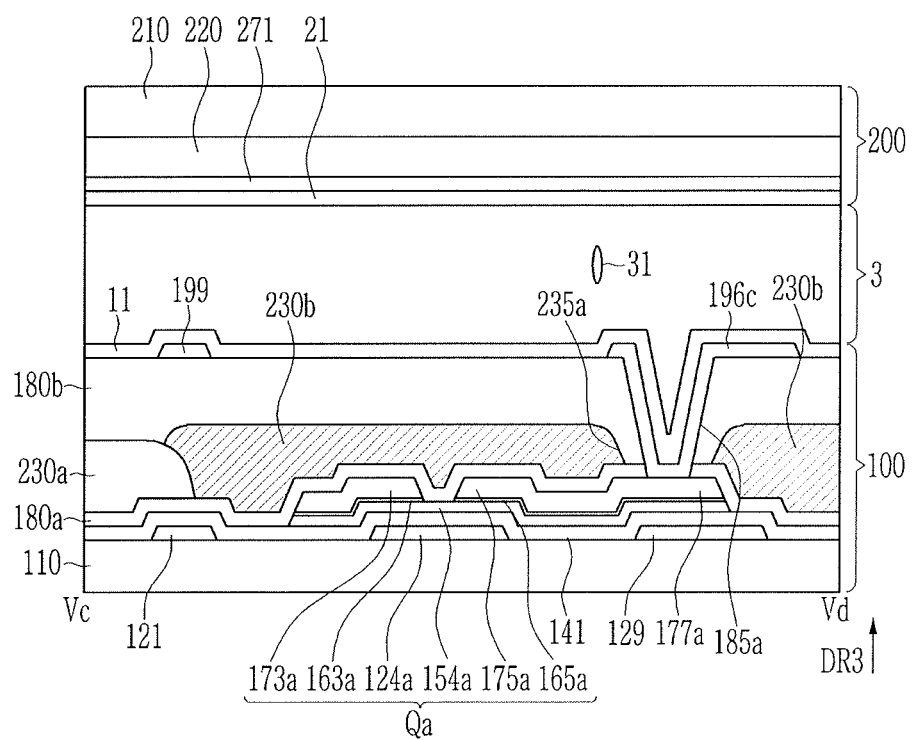
FIG. 39 illustrates a cross-sectional view of the display device shown in FIG. 38 taken along a line Vc-Vd.

Next, a structure of an example in which the display device according to an exemplary embodiment is a liquid crystal display is described with reference to FIG. 38 and FIG. 39 along with the above-described drawings. FIG. 38 is a layout view of three adjacent pixels of a display device according to an exemplary embodiment. FIG. 39 is a cross-sectional view of the display device shown in FIG. 38 taken along a line Vc-Vd.

The display device according to an exemplary embodiment as the liquid crystal display may include a first display panel 100 and a second display panel 200, and a liquid crystal layer 3 between two display panels 100 and 200 in a cross-sectional view, e.g., along the third direction DR3.

The above-described first display area DA1 may include a plurality of pixels PXa, PXb, and PXc. The plurality of pixels PXa, PXb, and PXc may be repeatedly arranged in the first direction DR1 and the second direction DR2.

The first display panel 100 may include a gate conductive layer including a gate line 121 on the substrate 110, a storage electrode line 132, and a dummy pattern 129.

The gate line 121 may mainly extend in the first direction DR1 and may transmit the gate signal. The gate line 121 may include a first gate electrode 124a and a second gate electrode in each pixel PXa, PXb, and PXc.

The storage electrode line 132 may include a transverse part 132a extending substantially parallel to the gate line 121, and a longitudinal part 132b connected to the transverse part 131a. The longitudinal part 132b of the storage electrode line 132 may extend along a boundary between two adjacent pixels of PXa, PXb, and PXc.

The dummy pattern 129 may be between the transverse part 132a of the adjacent storage electrode line 132 and the gate line 121. Each dummy pattern 129 may have an island shape.

The gate insulating layer 140 may be on the gate conductive layer, and a semiconductor layer including a first semiconductor 154a and a second semiconductor may be thereon. The first semiconductor 154a may overlap the first gate electrode 124a and the second semiconductor may overlap the second gate electrode. The semiconductor layer may include amorphous silicon, polycrystalline silicon, a metal oxide, or the like.

Ohmic contacts (ohmic contact members) 163a and 165a may be on the semiconductor layer. A data conductive layer including a plurality of data lines, including a first data line 171a and a second data line 171b, a plurality of first drain electrodes 175a, and a plurality of second drain electrodes may be on the ohmic contacts 163a and 165a.

The first data line 171a may include a first source electrode 173a overlapping the first gate electrode 124a, and the second data line 171b may include a second source electrode overlapping the second gate electrode.

The first drain electrode 175a and the second drain electrode may respectively include an end portion of a rod type and an expanding portion 177a of a wide end portion. Each first drain electrode 175a may overlap the dummy pattern 129 of the gate conductive layer.

The first gate electrode 124a, the first source electrode 173a, and the first drain electrode 175a form the first transistor Qa along with the first semiconductor 154a, and the second gate electrode, the second source electrode, and the second drain electrode form the second transistor Qb along with the second semiconductor. The first and second transistors Qa and Qb may function as switching elements for transferring the data voltage transmitted by the first and second data lines 171a and 171b according to a gate signal transmitted by the gate line 121.

The region where the gate line 121, the transverse part 132a of the storage electrode line 132, and the first and second transistors Qa and Qb are disposed may be obscured by a light blocking member 220. The light blocking member 220 may mainly extend to the first direction DR1 to form a shading region of each pixel PXa, PXb, and PXc.

A first insulating layer 180a may be on the data conductive layer. The first insulating layer 180a may include the organic insulating material or the inorganic insulating material.

A plurality of color filters 230a and 230b may be on the first insulating layer 180a. Each color filter 230a and 230b may include an opening 235a that overlaps the expanding portion 177a of the first and second drain electrodes 175a, respectively.

A second insulating layer 180b may be on the color filters 230a and 230b. The second insulating layer 180b may include the inorganic insulating material or the organic insulating material, and may have an almost planar top surface by particularly including the organic insulating material.

The first and second insulating layers 180a and 180b may include a contact hole 185a above the expanding portion 177a of the first drain electrode 175a, and a contact hole above the expanding portion of the second drain electrode. A pixel electrode layer including the pixel electrode including a plurality of first sub-pixel electrodes 191cc, a plurality of second sub-pixel electrodes 191dd, and a shielding electrode 199, may be on the second insulating layer 180b.

Each overall shape of the first sub-pixel electrode 191cc and the second sub-pixel electrode 191dd may be quadrangular. The first sub-pixel electrode 191cc may include a cross-shaped stem part including a transverse stem part 192c extending along the first direction DR1, a longitudinal stem part 193c extending along the second direction DR2, and a plurality of branch parts 194c extending outside from the cross-shaped stem part along a diagonal direction. The second sub-pixel electrode 191dd may include a cross-shaped stem part including a transverse stem part 192d extending along the first direction DR1, a longitudinal stem part 193d extending along the second direction DR2, and a plurality of branch parts 194d extending outside from the cross-shaped stem part along a diagonal direction.

The first sub-pixel electrode 191cc may include an extending part 195c protruded toward the expanding portion 177a of the first drain electrode 175a and a contact portion 196c connected to the extending part 195c end, and the second sub-pixel electrode 191dd may include an extending part 195d protruded toward the extension part of the second drain electrode and a contact portion 196d connected to the extending part 195d end. The contact portion 196c is electrically connected to the expanding portion 177a of the first drain electrode 175a through the contact hole 185a, and the contact portion 196d is electrically connected to the extension part of the second drain electrode through the contact hole.

The shielding electrode 199 extends between adjacent pixels PXa, PXb, and PXc in the first direction DR1 and/or between adjacent pixels PXa, PXb, and PXc in the second direction DR2, thereby preventing coupling and light leakage between the adjacent pixels PXa, PXb, and PXc.

The pixel electrode layer may include a transparent conductive material such as indium-tin oxide (ITO), indium-zinc oxide (IZO), a metal thin film, and the like.

An alignment layer 11 may be on the pixel electrode layer and the second insulating layer 180b. In the second display panel 200, the light blocking member 220 may be on a substrate 210 (under the substrate 210 in FIG. 3). A common electrode 271 may be on the light blocking member 220 (under the light blocking member 220 in FIG. 3). The common electrode 271 may be formed on the entire surface of the substrate 210. The common electrode 271 may transmit the common voltage. The common electrode 271 may include the transparent conductive material such as ITO, IZO, the metal thin film, and the like. An alignment layer 21 may be on the common electrode 271 (under the common electrode 271 in FIG. 39). The liquid crystal layer 3 between the alignment layers 11 and 21 may include a plurality of liquid crystal molecules 31.

The first display area DA1 described above may have the structure shown in FIG. 38 and FIG. 39. The plane structure and the cross-sectional stacking structure of the pixel area PU2 of the second display area DA2 may have the part of the structure shown in FIG. 38 and the structure shown in FIG. 39.

In the light transmitting area TA of the second display area DA2, at least a part required for displaying the image among the structure shown in FIG. 38 and FIG. 39, e.g., at least part of the semiconductor layer, the gate electrode 124a, the drain electrode 175a, the sub-pixel electrodes 191cc and 191dd, and/or the common electrode 271, may be removed. Accordingly, the light transmittance in the light transmitting area TA may be higher than the light transmittance in the pixel areas PU1 and PU2. The substrate 110 may not be removed in the light transmitting area TA.

Exemplary embodiments of the present disclosure increase light transmittance of a display area corresponding to an optical member and improve display quality of an image displayed in a region of the display device having functions in addition to the image display.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
    a first display area that includes a first pixel area and a second pixel area;
    a second display area that includes a third pixel area and a fourth pixel area;
    a first driving transistor of a plurality of transistors connected to the first pixel area; and
    a second driving transistor of the plurality of transistors connected to the third pixel area, wherein
    the first driving transistor and the second driving transistor drive pixels of a same color;
    a distance between the first pixel area and the second pixel area is smaller than a distance between the third pixel area and the fourth pixel area, and
    a shape of a channel region of the first driving transistor is different from a shape of a channel region of the second driving transistor.

2. The display device as claimed in claim 1, wherein a width of the channel region of the first driving transistor is different from a width of the channel region of the second driving transistor.

3. The display device as claimed in claim 2, wherein the width of the channel region of the first driving transistor is smaller than the width of the channel region of the second driving transistor.

4. The display device as claimed in claim 3, wherein a length of the channel region of the first driving transistor is different from a length of the channel region of the second driving transistor.

5. The display device as claimed in claim 4, wherein the length of the channel region of the first driving transistor is greater than the length of the channel region of the second driving transistor.

6. The display device as claimed in claim 1, wherein a length of the channel region of the first driving transistor is different from a length of the channel region of the second driving transistor.

7. The display device as claimed in claim 6, wherein
the length of the channel region of the first driving transistor is greater than the length of the channel region of the second driving transistor.

8. The display device as claimed in claim 1, wherein
the channel region of the first driving transistor is curved, and
the channel region of the second driving transistor is straight.

9. The display device as claimed in claim 1, wherein
a plurality of pixels of same color are arranged side by side along a first direction in a plan view.

10. The display device as claimed in claim 9, wherein
a distance between the plurality of pixels of same color in the first display area is different from a distance between the plurality of pixels of same color in the second display area.

11. The display device as claimed in claim 10, wherein
the distance between the plurality of pixels of same color in the first display area is smaller than the distance between the plurality of pixels of same color in the second display area.

12. The display device as claimed in claim 1, wherein
at least two or more pixel areas are repeatedly arranged along a first direction and a second direction different from the first direction in a plan view.

13. The display device as claimed in claim 12, wherein
a distance between two pixel areas in the first display area is different from a distance between two pixel areas along the first direction.

14. The display device as claimed in claim 13, wherein
a distance between two pixel areas in the first display area along the first direction is smaller than a distance between two pixel areas in the second display area along the first direction.

15. The display device as claimed in claim 13, wherein
a distance between two pixel areas in the first display area along the first direction is different from a distance between two pixel areas in the second display area along the first direction.

16. The display device as claimed in claim 15, wherein
a distance between two pixel areas in the first display area along the second direction is different from a distance between two pixel areas in the second display area along the second direction.

17. The display device as claimed in claim 1, wherein
the second display area further includes a light transmitting area between the third pixel area and the fourth pixel area, and
the light transmitting area does not includes a pixel capable of displaying an image and has higher light transmittance than the third pixel area and the fourth pixel area.

18. The display device as claimed in claim 17, wherein
the third pixel includes an active pattern, a driving gate electrode, a driving voltage line, a pixel electrode, an emission layer, and a common electrode that are electrically connected to each other for displaying the image, and
the light transmitting areas does not include at least part of at least one of the active pattern, the driving gate electrode, the driving voltage line, the pixel electrode, the emission layer, and the common electrode.

19. The display device as claimed in claim 1, wherein
Each of the first pixel area, the second pixel area, the third pixel area, and the fourth pixel area includes a first color pixel outputting a first color, a second color pixel outputting a second color different from the first color, and a third color pixel outputting a third color different from the first color and the second color,
at least two of the first color pixels, the second color pixels, and the third color pixels have different sizes.

20. The display device as claimed in claim 19, wherein
each of the first pixel area and the second pixel area includes one first color pixel, two second color pixel, and one third color pixel, and
each of the third pixel area and the fourth pixel area includes one first color pixel, one second color pixel, and one third color pixel.

21. The display device as claimed in claim 1, further comprising:
a third driving transistor of the plurality of transistors connected to the second pixel area; and
a fourth driving transistor of the plurality of transistors connected to the fourth pixel area, wherein
a shape of a channel region of the first driving transistor is different from a shape of a channel region of the second driving transistor, and
the first, second, third, and fourth driving transistors drive pixels pf a same color.

22. The display device as claimed in claim 21, wherein a closest distance between the first pixel area and the second pixel area is smaller than a closest distance between the third pixel area and the fourth pixel area.

23. The display device as claimed in claim 1, further comprising:
a fifth driving transistor of the plurality of transistors connected to the first pixel area; and
a sixth driving transistor of the plurality of transistors connected to the third pixel area, wherein
the fifth and sixth transistors drive pixels of a second color different from the color of the pixels driven by the first and second transistors, and
the shape of the channel region of the first driving transistor is the same as a shape of a channel region of the fifth driving transistor, and
the shape of the channel region of the second driving transistor is the same as a shape of a channel region of the sixth driving transistor.

* * * * *